US012222897B2

(12) United States Patent
Zou et al.

(10) Patent No.: US 12,222,897 B2
(45) Date of Patent: Feb. 11, 2025

(54) FILE STORAGE LOCATION DETERMINING METHOD AND APPARATUS, AND TERMINAL

(71) Applicant: HUAWEI TECHNOLOGIES CO., LTD., Guangdong (CN)

(72) Inventors: Lianbo Zou, Shenzhen (CN); Wei Zhang, Shenzhen (CN); Puliang Luo, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/017,019

(22) PCT Filed: Jul. 26, 2021

(86) PCT No.: PCT/CN2021/108476
§ 371 (c)(1),
(2) Date: Jan. 19, 2023

(87) PCT Pub. No.: WO2022/022466
PCT Pub. Date: Feb. 3, 2022

(65) Prior Publication Data
US 2024/0296144 A1 Sep. 5, 2024

(30) Foreign Application Priority Data

Jul. 31, 2020 (CN) .......................... 202010769966.7

(51) Int. Cl.
*G06F 16/00* (2019.01)
*G06F 16/13* (2019.01)
*G06F 16/14* (2019.01)

(52) U.S. Cl.
CPC .............. *G06F 16/14* (2019.01); *G06F 16/13* (2019.01)

(58) Field of Classification Search
CPC .................................. G06F 16/14; G06F 16/13
See application file for complete search history.

(56) References Cited

U.S. PATENT DOCUMENTS

| 11,635,903 B2* | 4/2023 | Masuda | G06F 3/0635 |
| | | | 711/154 |
| 2002/0183117 A1* | 12/2002 | Takahashi | A63F 13/35 |
| | | | 463/42 |

(Continued)

FOREIGN PATENT DOCUMENTS

| CN | 103412773 A | * 11/2013 | .......... G06F 17/301 |
| CN | 110018982 A | 7/2019 | |

(Continued)

*Primary Examiner* — Noosha Arjomandi

(57) ABSTRACT

Embodiments of this application are applicable to the field of terminal technologies, and provide a file storage location determining method and apparatus, and a terminal. The method includes: A first terminal determines a plurality of candidate paths corresponding to a target file. Each candidate path points to one file storage location. The first terminal obtains file information of the target file. The first terminal determines, based on the file information and the plurality of candidate paths, a file storage location pointed to by a first candidate path in the plurality of candidate paths as a storage location of the target file. A matching degree of the first candidate path is a highest matching degree in matching degrees of the plurality of candidate paths. According to the foregoing method, accuracy of determining the file storage location is improved.

18 Claims, 7 Drawing Sheets

(56) References Cited

U.S. PATENT DOCUMENTS

| | | | | |
|---|---|---|---|---|
| 2015/0124281 A1* | 5/2015 | Watanabe | ......... | H04N 1/00326 |
| | | | | 358/1.14 |
| 2016/0072739 A1* | 3/2016 | He | ......... | H04L 51/10 |
| | | | | 709/206 |
| 2016/0092441 A1* | 3/2016 | Zhang | ......... | G06F 16/14 |
| | | | | 707/758 |
| 2020/0218694 A1* | 7/2020 | Zeng | ......... | G06F 16/13 |
| 2023/0195446 A1* | 6/2023 | Wang | ......... | G16H 40/67 |
| | | | | 717/169 |
| 2024/0244068 A1* | 7/2024 | Crabtree | ......... | H04L 63/0876 |

FOREIGN PATENT DOCUMENTS

| | | | | |
|---|---|---|---|---|
| CN | 110147350 A | | 8/2019 | |
| CN | 111045988 A | | 4/2020 | |
| EP | 4174674 A1 * | | 5/2023 | ............. G06F 16/13 |

\* cited by examiner

FILE STORAGE LOCATION DETERMINING METHOD AND APPARATUS, AND TERMINAL

CROSS-REFERENCE TO RELATED APPLICATIONS

This application is a National Stage of International Application No. PCT/CN2021/108476, filed on Jul. 26, 2021, which claims priority to Chinese Patent Application No. 202010769966.7, filed on Jul. 31, 2020, both of which are hereby incorporated by reference in their entireties.

TECHNICAL FIELD

Embodiments of this application relate to the field of terminal technologies, and in particular, to a file storage location determining method and apparatus, and a terminal.

BACKGROUND

Near field communication (near field communication, NFC) is a short-range high-frequency wireless communication technology. Devices (for example, a first terminal and a second terminal) having an NFC function may exchange data when they are close to each other.

In a specific application scenario in which the first terminal and the second terminal exchange data, the first terminal may transfer a file selected by a user to the second terminal, and a prerequisite for implementing file transfer is that the first terminal can accurately determine a storage location of the file, to obtain the file from the storage location.

In the conventional technology, a first terminal may obtain path information of a file by parsing a command line, invoking a program interface of a corresponding program, or the like, to determine a storage location of the file based on the path information. However, this method is easily affected by an application version, and an accuracy rate is relatively low. For example, when the file is compatible with a plurality of versions of an application, or the application is not correctly activated, after obtaining the path information by parsing a command line or invoking a program interface, the first terminal may not accurately determine the storage location of the file based on the path information.

SUMMARY

Embodiments of this application provide a file storage location determining method and apparatus, and a terminal, to improve accuracy of determining a file storage location.

To achieve the foregoing objective, this application uses the following technical solutions.

According to a first aspect, a file storage location determining method is provided, including:

A first terminal determines a plurality of candidate paths corresponding to a target file, and obtains file information of the target file. Because each candidate path points to one file storage location, the first terminal may determine, based on the file information and the plurality of candidate paths, a file storage location pointed to by a first candidate path in the plurality of candidate paths as a storage location of the target file. A matching degree of the first candidate path is a highest matching degree in matching degrees of the plurality of candidate paths.

In a possible implementation of this embodiment of this application, before the first terminal obtains the plurality of candidate paths corresponding to the target file, the first terminal may determine a to-be-transmitted target file. That the first terminal determines the to-be-transmitted target file may be implemented in a plurality of manners. In one manner, in response to a click operation performed by a user on any file in the first terminal, the first terminal determines the to-be-transmitted target file based on the click operation. In another manner, after receiving a file transfer instruction from a second terminal, the first terminal determines, based on identification information of the to-be-transmitted file carried in the file transfer instruction, a file indicated by the identification information as the target file.

In a possible implementation of this embodiment of this application, the target file may be a file stored in the first terminal, or may be a file stored in an external storage device of the first terminal.

In a possible implementation of this embodiment of this application, that a first terminal determines a plurality of candidate paths corresponding to a target file may be implemented in one or more of the following manners: object linking and embedding interface invoking, file searching, reading of information about recently used files, and command line parsing. The candidate path is determined in one or more manners, so that a success rate of path obtaining can be improved.

In a possible implementation of this embodiment of this application, when obtaining the file information of the target file, the first terminal may first obtain window information of the target file. The window information may be information displayed at a preset location of the target file. For example, the window information may be information displayed in a title bar at the top of the target file. Then, the first terminal determines the file information of the target file based on the window information. The file information of the target file may include one or more of the following: a file name or a file name extension of the target file.

In a possible implementation of this embodiment of this application, the first terminal determines a matching degree of each of the plurality of candidate paths based on the file information.

In a possible implementation of this embodiment of this application, the first terminal may process the file information of the target file in a preset first processing manner and/or a preset second processing manner, to obtain a corresponding processing result. The first processing manner may be an exact match processing manner, the second processing manner may be a fuzzy match processing manner, and precision of the first processing manner is higher than precision of the second processing manner. The first terminal determines the matching degree of each of the plurality of candidate paths based on the processing result and path information included in each candidate path.

In a possible implementation of this embodiment of this application, that the first terminal determines the matching degree of each of the plurality of candidate paths based on the processing result and the path information included in each candidate path may be: performing matching between the processing result of the first processing manner and/or the processing result of the second processing manner and path information included in a second candidate path, and determining the matching degree of each of the plurality of candidate paths based on a matching result. The second candidate path is any of the plurality of candidate paths. The processing result of the first processing manner is a character string that includes the file information of the target file. If path information of a second candidate path includes the processing result of the first processing manner, for example, the path information of the second candidate path includes a complete character string corresponding to the file information of the target file, the first terminal determines a matching degree of the second candidate path as a first matching degree. If the path information of the second candidate path does not include the processing result of the first processing manner, the first terminal determines the matching degree of the second candidate path based on the processing result of the second processing manner. The processing result of the second processing manner includes a plurality of features of the target file, and each feature is in a one-to-one correspondence with each substring in the character string corresponding to the file information.

In a possible implementation of this embodiment of this application, that the first terminal determines the matching degree of the second candidate path based on the processing result of the second processing manner may be: separately performing matching between the plurality of features of the target file and the path information included in the second candidate path, and determining the matching degree of the second candidate path based on a quantity of matched features. For example, if a quantity of features of the target file that are included in the path information of the second candidate path is greater than or equal to a first threshold, the first terminal determines the matching degree of the second candidate path as a second matching degree. If the quantity of features of the target file that are included in the path information of the second candidate path is greater than or equal to a second threshold and less than the first threshold, the first terminal determines the matching degree of the second candidate path as a third matching degree. If the quantity of features of the target file that are included in the path information of the second candidate path is less than the second threshold, the first terminal determines the matching degree of the second candidate path as a fourth matching degree. The second matching degree is less than the first matching degree, the third matching degree is less than the second matching degree, and the fourth matching degree is less than the third matching degree.

In a possible implementation of this embodiment of this application, when the first terminal performs matching between the processing result of the first processing manner and/or the processing result of the second processing manner and the path information of the second candidate path, the first terminal may first perform matching between the processing result of the first processing manner and the path information of the second candidate path, and then perform matching between the processing result of the second processing manner and the path information of the second candidate path. Alternatively, the first terminal may first perform matching between the processing result of the second processing manner and the path information of the second candidate path, and then perform matching between the processing result of the first processing manner and the path information of the second candidate path. Alternatively, the first terminal simultaneously performs matching between the processing result of the first processing manner and the path information of the second candidate path and between the processing result of the second processing manner and the path information of the second candidate path.

In a possible implementation of this embodiment of this application, the first terminal first performs matching between the processing result of the first processing manner and the path information of the second candidate path. If there is a match between the processing result of the first processing manner and the path information of the second candidate path, that is, the path information of the second candidate path includes a complete character string corresponding to the processing result of the first processing manner, the first terminal determines the matching degree of the second candidate path as the first matching degree. The first terminal stops a subsequent matching process and does no longer perform matching between the processing result of the second processing manner and the path information of the second candidate path. If the processing result of the first processing manner matches the path information of the second candidate path, that is, the path information of the second candidate path does not include a complete character string corresponding to the processing result of the first processing manner, the first terminal continues to perform matching between the processing result of the second processing manner and the path information of the second candidate path. The processing result of the second processing manner includes the plurality of features of the target file. The first terminal determines the matching degree of the second candidate path based on the quantity of features included in the path information of the second candidate path.

In a possible implementation of this embodiment of this application, if there are a plurality of candidate paths corresponding to the highest matching degree, the first terminal determines a priority of each candidate path corresponding to the highest matching degree. The first terminal determines, as the storage location of the target file, a file storage location pointed to by a candidate path with a highest priority in the plurality of candidate paths corresponding to the highest matching degree. The priority of the candidate path is obtained based on a priority of a manner of determining the candidate path.

In a possible implementation of this embodiment of this application, a priority relationship between a plurality of manners of determining the candidate path is as follows: A priority of the file searching is higher than a priority of the object linking and embedding interface invoking, the priority of the object linking and embedding interface invoking is higher than a priority of the command line parsing, and the priority of the command line parsing is higher than a priority of the reading of information about recently used files.

In a possible implementation of this embodiment of this application, after the first terminal determines the storage location of the target file, the first terminal may obtain the target file from the storage location. The first terminal sends the target file to a second terminal.

According to a second aspect, a file storage location determining apparatus is provided. The apparatus is used in a first terminal. The apparatus includes:

a candidate path determining module, configured to determine a plurality of candidate paths corresponding to a target file, where each candidate path points to one file storage location;

a file information obtaining module, configured to obtain file information of the target file; and a storage location determining module, configured to determine, based on the file information and the plurality of candidate paths, a file storage location pointed to by a first candidate path in the plurality of candidate paths as a storage location of the target file, where a matching degree of the first candidate path is a highest matching degree in matching degrees of the plurality of candidate paths. According to a third aspect, a terminal is provided, including a memory, a processor, and a computer program that is stored in the memory and that can be run on the processor. When executing the computer program, the processor implements the file storage location determining method according to any one of the first aspect or the possible implementations of the first aspect.

According to a fourth aspect, a computer-readable storage medium is provided. The computer-readable storage medium stores computer instructions. When the computer instructions are run on a first terminal, the first terminal is enabled to perform the file storage location determining method according to any one of the first aspect or the possible implementations of the first aspect.

According to a fifth aspect, a computer program product is provided. When the computer program product runs on a computer, the computer is enabled to perform the file storage location determining method according to any one of the first aspect or the possible implementations of the first aspect.

According to a sixth aspect, a chip is provided. The chip includes a memory and a processor. The processor executes a computer program stored in the memory, to implement the file storage location determining method according to any one of the first aspect or the possible implementations of the first aspect.

For the file storage location determining method and apparatus, and the terminal provided in embodiments of this application, the first terminal may obtain the plurality of candidate paths corresponding to the target file in a plurality of different manners. Then, based on the obtained file information of the target file, the first terminal may process the file information and each candidate path in the first processing manner and/or the second processing manner with different precision, to determine the matching degree of each candidate path based on the processing result. Because the matching degree may be used to indicate a possibility that a location corresponding to each candidate path belongs to an actual storage location of the target file, the first terminal may determine a location corresponding to the candidate path with the highest matching degree as the file storage location of the target file. In embodiments of this application, a path is obtained in a plurality of manners, to improve a success rate of path obtaining. On this basis, a possibility that the location corresponding to each candidate path belongs to the file storage location is determined with reference to the file information of the target file. This improves accuracy of determining the file storage location. Even in a scenario in which a plurality of files are opened in a single process, an application that opens the target file is not activated, or the target file is protected, the storage location of the file can be accurately determined by using the foregoing method. In actual application, the foregoing method can be used to increase a success rate of determining the file storage location to more than 95%.

DESCRIPTION OF EMBODIMENTS

Figure 1:
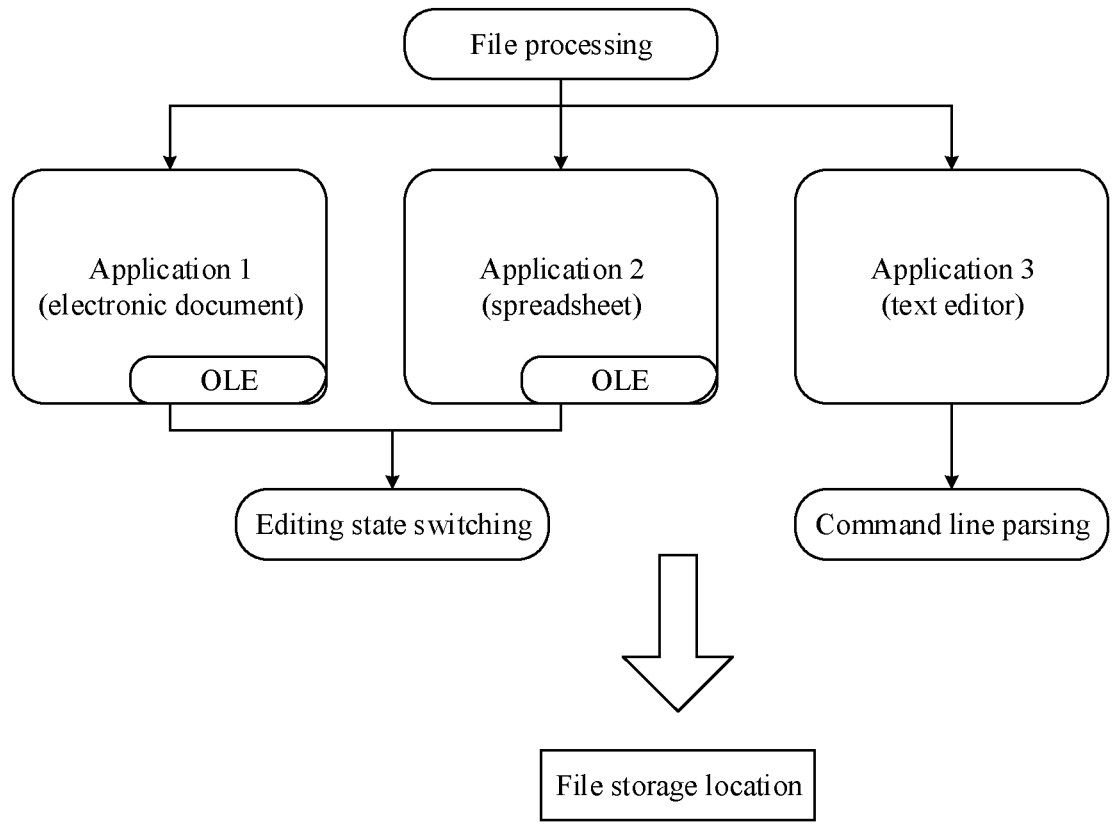
FIG. 1 is a schematic diagram in which a file storage location is determined in the conventional technology.

To clearly describe the technical solutions in embodiments of this application, terms such as "first" and "second" are used in embodiments of this application to distinguish between same items or similar items that provide basically same functions or purposes. For example, a first matching degree, a second matching degree, a third matching degree, and the like are merely used to distinguish between different matching degrees, and a quantity and an execution sequence of the first matching degree, the second matching degree, and the third matching degree are not limited.

It should be noted that, in embodiments of this application, the term such as "example" or "for example" is used to represent giving an example, an illustration, or descriptions. Any embodiment or design scheme described as an "example" or "for example" in embodiments of this application should not be explained as being more preferred or having more advantages than another embodiment or design scheme. Exactly, use of the word such as "example" or "for example" is intended to present a related concept in a specific manner.

A service scenario described in embodiments of this application is intended to describe the technical solutions in embodiments of this application more clearly, but does not constitute a limitation on the technical solutions provided in embodiments of this application. A person of ordinary skill in the art may learn that as a new service scenario emerges, the technical solutions provided in embodiments of this application are also applicable to a similar technical problem.

In embodiments of this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" generally represents an "or" relationship between the associated objects. "At least one of the following items (pieces)" or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural.

Steps in a file storage location determining method provided in embodiments of this application are merely examples. Not all steps are mandatory, or not all content in each piece of information or each message is mandatory. The steps or the content may be added or reduced as required in a use process.

A same step or steps or messages having a same function in embodiments of this application may be mutually referenced in different embodiments.

Currently, for a file (for example, a picture, an office document, a web page, or a short video) displayed on an electronic device, the electronic device may parse a start command line carried in a process (Process) corresponding to the file, to determine a storage location of the file. Alternatively, if an application that runs the file is a program provided with an object linking and embedding (object linking and embedding, OLE) interface, the electronic device may determine a storage location of the file through the OLE interface of the application.

FIG. 1 is a schematic diagram in which a file storage location is determined in the conventional technology. For example, a file is an electronic document (for example, Word) or a spreadsheet (for example, Excel), and an electronic device is an electronic device running the Microsoft Windows® (Microsoft Windows®) operating system (briefly referred to as the Windows® operating system). In the Windows® operating system, the electronic device may open the electronic document (for example, Word) by using an application 1 having an OLE interface, or open a file such as a spreadsheet (for example, Excel) by using an application 2 having an OLE interface. Therefore, the electronic device may determine a storage location of Word through the OLE interface of the application 1. The electronic device may determine a storage location of Excel through the OLE interface of the application 2.

As shown in FIG. 1, for example, the file is a file opened by using an application 3 such as a text editor (NotePad++). The electronic device may determine a storage location of the file by parsing a startup command line carried in a process corresponding to the file.

However, in the Windows® operating system, more applications such as the text editor shown in FIG. 1 open a plurality of files in a single process. For such applications, process information usually includes only path information when the file was first opened. If a plurality of files of a same type are currently opened at the same time, the electronic device cannot determine a storage location of the file based on the process information. In addition, if an application with an OLE interface is not activated, the OLE interface may not work properly. In addition, if a file displayed on the electronic device is in a protected mode or a read-only mode, the electronic device can obtain only a file name of the file through the OLE interface, and cannot accurately determine a storage location of the file.

Based on the foregoing problem, an embodiment of this application provides a file storage location determining method. The method may be applied to a first electronic device. In the method, the first electronic device may obtain a plurality of candidate paths corresponding to a target file in a plurality of manners. Then, the first electronic device calculates a matching degree of each of the plurality of candidate paths. The first electronic device may determine a location corresponding to a candidate path with a highest matching degree as a storage location of the target file. In this way, accuracy of determining a file storage location can be improved.

Figure 2:
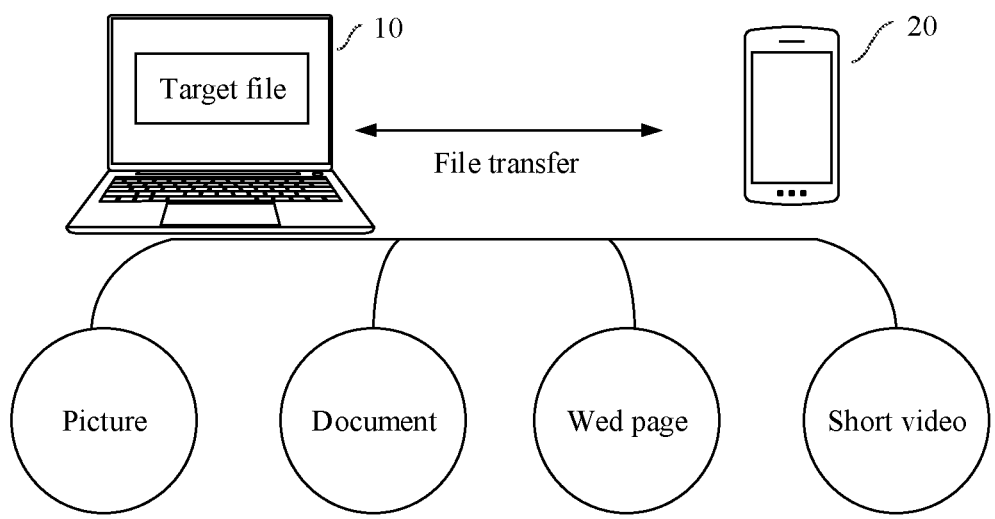
FIG. 2 is a schematic diagram of a structure of an electronic device according to an embodiment of this application.

FIG. 2 is a schematic diagram of a scenario according to an embodiment of this application. The schematic diagram of the scenario shows a first electronic device 10 and a second electronic device 20 that communicates with the first electronic device 10.

The first electronic device 10 and the second electronic device 20 may be electronic devices that can establish a communication connection by using a short-range wireless communication technology.

For example, the short-range wireless communication technology may include communication technologies such as NFC, Bluetooth, and Wi-Fi.

For example, the first electronic device 10 and the second electronic device 20 may establish the communication connection based on the NFC technology. When the second electronic device 20 is located in an NFC sensing area of the first electronic device 10, the second electronic device 20 may trigger a file transfer instruction, to instruct the first electronic device 10 to send a target file to the second electronic device 20.

The target file may be a file such as a picture, a document, a web page, or a short video that is currently opened in the first electronic device 10.

In this embodiment of this application, the first electronic device 10 or the second electronic device 20 may be an electronic device such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA) that has a short-range wireless communication technology. A specific type of the first electronic device 10 or the second electronic device 20 is not limited in this embodiment of this application.

The first electronic device 10 and the second electronic device 20 in this embodiment of this application may be electronic devices of a same type. For example, both the first electronic device 10 and the second electronic device 20 are mobile phones. Alternatively, both the first electronic device 10 and the second electronic device 20 are notebook computers. Alternatively, the first electronic device 10 and the second electronic device 20 in this embodiment of this application may be electronic devices of different types. For example, the first electronic device 10 is a notebook computer, and the second electronic device 20 is a mobile phone.

Figure 3:
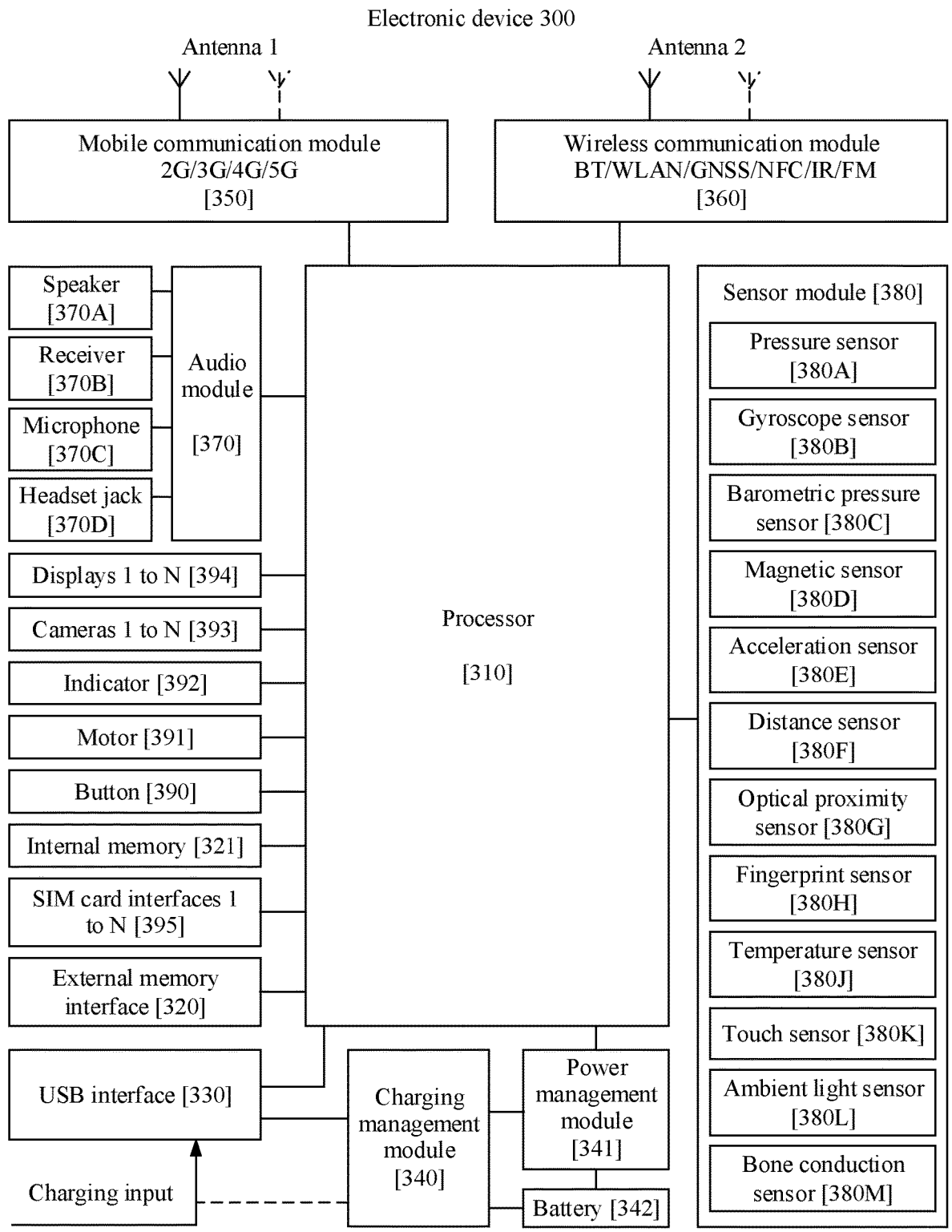
FIG. 3 is a schematic diagram of a scenario to which a file storage location determining method is applicable according to an embodiment of this application.

For example, FIG. 3 is a schematic diagram of a structure of an electronic device. For structures of the first electronic device 10 and the second electronic device 20, refer to an architecture of an electronic device 300. The electronic device 300 may include a processor 310, an external memory interface 320, an internal memory 321, a universal serial bus (universal serial bus, USB) interface 330, a charging management module 340, a power management module 341, a battery 342, an antenna 1, an antenna 2, a mobile communication module 350, a wireless communication module 360, an audio module 370, a speaker 370A, a receiver 370B, a microphone 370C, a headset jack 370D, a sensor module 380, a button 390, a motor 391, an indicator 392, a camera 393, a display 394, a subscriber identification module (subscriber identification module, SIM) card interface 395, and the like. The sensor module 380 may include a pressure sensor 380A, a gyroscope sensor 380B, a barometric pressure sensor 380C, a magnetic sensor 380D, an acceleration sensor 380E, a distance sensor 380F, an optical proximity sensor 380G, a fingerprint sensor 380H, a temperature sensor 380J, a touch sensor 380K, an ambient light sensor 380L, a bone conduction sensor 380M, and the like.

It may be understood that the structure shown in this embodiment of this application does not constitute a specific limitation on the electronic device 300. In some other embodiments of this application, the electronic device 300 may include more or fewer components than those shown in the figure, or some components may be combined, or some components may be split, or different component arrangements may be used. The components shown in the figure may be implemented by hardware, software, or a combination of software and hardware.

The processor 310 may include one or more processing units. For example, the processor 310 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 300. The controller may generate an operation control signal based on an instruction operation code and a time sequence signal, to complete control of instruction reading and instruction execution.

A memory may be further disposed in the processor 310, and is configured to store instructions and data. In some embodiments, the memory in the processor 310 is a cache. The memory may store instructions or data just used or cyclically used by the processor 310. If the processor 310 needs to use the instructions or the data again, the processor 310 may directly invoke the instructions or the data from the memory. This avoids repeated access and reduces waiting time of the processor 310. Therefore, system efficiency is improved.

In some embodiments, the processor 310 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 310 may include a plurality of groups of I2C buses. The processor 310 may be coupled to the touch sensor 380K, a charger, a flash light, the camera 393, and the like through different I2C bus interfaces. For example, the processor 310 may be coupled to the touch sensor 380K through the I2C interface, so that the processor 310 communicates with the touch sensor 380K through the I2C bus interface to implement a touch function of the electronic device 300.

The I2S interface may be configured to perform audio communication. In some embodiments, the processor 310 may include a plurality of groups of I2S buses. The processor 310 may be coupled to the audio module 370 through the I2S bus, to implement communication between the processor 310 and the audio module 370. In some embodiments, the audio module 370 may send an audio signal to the wireless communication module 360 through the I2S interface, to implement a function of answering a call through a Bluetooth headset.

The PCM interface may also be used to perform audio communication, and sample, quantize, and code an analog signal. In some embodiments, the audio module 370 may be coupled to the wireless communication module 360 through the PCM bus interface. In some embodiments, the audio module 370 may also transmit an audio signal to the wireless communication module 360 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication.

In some embodiments, the UART interface is usually configured to connect the processor 310 to the wireless communication module 360. For example, the processor 310 communicates with a Bluetooth module in the wireless communication module 360 through the UART interface, to implement a Bluetooth function. In some embodiments, the audio module 370 may transmit an audio signal to the wireless communication module 360 through the UART interface, to implement a function of playing music through a Bluetooth headset.

The MIPI interface may be configured to connect the processor 310 to a peripheral component such as the display 394 or the camera 393. The MIPI includes a camera serial interface (camera serial interface, CSI), a display serial interface (display serial interface, DSI), and the like. In some embodiments, the processor 310 communicates with the camera 393 through the CSI, to implement a photographing function of the electronic device 300. The processor 310 communicates with the display 394 through the DSI interface, to implement a display function of the electronic device 300.

The GPIO interface may be configured by software. The GPIO interface may be configured as a control signal or a data signal. In some embodiments, the GPIO interface may be configured to connect the processor 310 to the camera 393, the display 394, the wireless communication module 360, the audio module 370, the sensor module 380, and the like. The GPIO interface may alternatively be configured as an I2C interface, an I2S interface, a UART interface, an MIPI interface, or the like.

The USB interface 330 is an interface that conforms to a USB standard specification, and may be specifically a mini USB interface, a micro USB interface, a USB Type-C interface, or the like. The USB interface 330 may be configured to connect to the charger to charge the electronic device 300, or may be configured to transmit data between the electronic device 300 and a peripheral device, or may be configured to connect to a headset for playing audio through the headset. The interface may be further configured to connect to another electronic device such as an AR device.

It can be understood that an interface connection relationship between modules illustrated in this embodiment of this application is merely an example for description, and does not constitute a limitation on the structure of the electronic device 300. In some other embodiments of this application, the electronic device 300 may alternatively use an interface connection manner different from the interface connection manner in this embodiment, or a combination of a plurality of interface connection manners.

The charging management module 340 is configured to receive a charging input from the charger. The charger may be a wireless charger or a wired charger. In some embodiments of wired charging, the charging management module 340 may receive a charging input from the wired charger through the USB interface 330. In some embodiments of wireless charging, the charging management module 340 may receive a wireless charging input through a wireless charging coil of the electronic device 300. When charging the battery 342, the charging management module 340 may further supply power to the electronic device by using the power management module 341.

The power management module 341 is configured to connect the battery 342 and the charging management module 340 to the processor 310. The power management module 341 receives an input from the battery 342 and/or the charging management module 340, and supplies power to the processor 310, the internal memory 321, an external memory, the display 394, the camera 393, the wireless communication module 360, and the like. The power management module 341 may be further configured to monitor parameters such as a battery capacity, a battery cycle count, and a battery health status (electric leakage or impedance). In some other embodiments, the power management module 341 may alternatively be disposed in the processor 310. In some other embodiments, the power management module 341 and the charging management module 340 may alternatively be disposed in a same component.

A wireless communication function of the electronic device 300 may be implemented through the antenna 1, the antenna 2, the mobile communication module 350, the wireless communication module 360, the modem processor, the baseband processor, and the like.

The antenna 1 and the antenna 2 are configured to transmit and receive electromagnetic wave signals. Each antenna in the electronic device 300 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 350 may provide a solution that is applied to the electronic device 300 and that includes wireless communication technologies such as 2G, 3G, 4G, and 5G. The mobile communication module 350 may include at least one filter, a switch, a power amplifier, a low noise amplifier (low noise amplifier, LNA), and the like. The mobile communication module 350 may receive an electromagnetic wave through the antenna 1, perform processing such as filtering or amplification on the received electromagnetic wave, and transmit the electromagnetic wave to the modem processor for demodulation. The mobile communication module 350 may further amplify a signal modulated by the modem processor, and convert the signal into an electromagnetic wave for radiation through the antenna 1.

In some embodiments, at least some functional modules in the mobile communication module 350 may be disposed in the processor 310. In some embodiments, at least some functional modules in the mobile communication module 350 and at least some modules in the processor 310 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 370A, the receiver 370B, or the like), or displays an image or a video by the display 294. In some embodiments, the modem processor may be an independent component. In some other embodiments, the modem processor may be independent of the processor 310, and is disposed in a same device as the mobile communication module 350 or another functional module.

The wireless communication module 360 may provide a wireless communication solution that includes a wireless local area network (wireless local area network, WLAN) (such as, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 300. The wireless communication module 360 may be one or more components integrating at least one communication processing module. The wireless communication module 360 receives an electromagnetic wave through the antenna 2, performs frequency modulation and filtering processing on the electromagnetic wave signal, and sends a processed signal to the processor 310. The wireless communication module 360 may further receive a to-be-sent signal from the processor 310, perform frequency modulation and amplification on the signal, and convert the signal into an electromagnetic wave for radiation through the antenna 2.

In some embodiments, the antenna 1 of the electronic device 300 is coupled to the mobile communication module 350, and the antenna 2 is coupled to the wireless communication module 360, so that the electronic device 300 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GNSS), a BeiDou navigation satellite system (Beidou navigation satellite system, BDS), a quasi-zenith satellite system (quasi-zenith satellite system, QZSS), and/or a satellite based augmentation system (satellite based augmentation systems, SBAS).

The electronic device 300 implements a display function by using the GPU, the display 394, the application processor, and the like. The GPU is a microprocessor for image processing, and is connected to the display 394 and the application processor. The GPU is configured to: perform mathematical and geometric computation, and render an image. The processor 310 may include one or more GPUs that execute program instructions to generate or change display information.

The display 394 is configured to display an image, a video, and the like. The display 394 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the electronic device 300 may include one or N displays 394, where N is a positive integer greater than 1.

The electronic device 300 may implement a photographing function by using the ISP, the camera 393, the video codec, the GPU, the display 394, the application processor, and the like.

The ISP is configured to process data fed back by the camera 393. For example, during photographing, a shutter is pressed, light is transferred to a camera photosensitive element through a lens, an optical signal is converted into an electrical signal, and the camera photosensitive element transmits the electrical signal to the ISP for processing, to convert the electrical signal into a visible image. The ISP may further perform algorithm optimization on noise, brightness, and complexion of an image. The ISP may further optimize parameters such as exposure and a color temperature of a photographing scenario. In some embodiments, the ISP may be disposed in the camera 393.

The camera 393 is configured to capture a static image or a video. An optical image of an object is generated through the lens, and is projected onto a photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 300 may include one or N cameras 393, where N is a positive integer greater than 1.

The digital signal processor is configured to process a digital signal, and may process another digital signal in addition to the digital image signal. For example, when the electronic device 300 performs frequency selection, the digital signal processor is configured to perform Fourier transform on frequency energy.

The video codec is configured to compress or decompress a digital video. The electronic device 300 may support one or more video codecs. In this way, the electronic device 300 can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transfer between human brain neurons, and may further continuously perform self-learning. The NPU may implement intelligent cognition of the electronic device 300 and other applications, for example, image recognition, facial recognition, speech recognition, and text understanding.

In this embodiment of this application, the NPU or another processor may be configured to perform operations such as face detection, face tracking, face feature extraction, and image clustering on a face image in a video stored in the electronic device 300, perform operations such as face detection and face feature extraction on a face image in a picture stored in the electronic device 300, and perform, based on facial features of the picture and a clustering result of the face image in the video, clustering on the picture stored in the electronic device 300.

The external memory interface 320 may be configured to connect to an external storage card, for example, a micro SD card, to extend a storage capability of the electronic device 300. The external storage card communicates with the processor 310 through the external memory interface 320, to implement a data storage function. For example, files such as music and videos are stored in the external storage card.

The internal memory 321 may be configured to store computer executable program code, and the computer-executable program code includes an instruction. The processor 310 executes various function applications and data processing of the electronic device 300 by running the instructions stored in the internal memory 321. The internal memory 321 may include a program storage area and a data storage area. The program storage area may store an operating system, an application required by at least one function (for example, a voice playing function or an image playing function), and the like. The data storage area may store data (such as audio data and a phone book) created when the electronic device 300 is used, and the like.

In addition, the internal memory 321 may include a high-speed random access memory, and may further include a nonvolatile memory, for example, at least one magnetic disk storage device, a flash storage device, or a universal flash storage (universal flash storage, UFS).

The electronic device 300 may implement audio functions, for example, music playing and recording, by using the audio module 370, the speaker 370A, the telephone receiver 370B, the microphone 370C, the headset jack 370D, the application processor, and the like.

The audio module 370 is configured to convert digital audio information into an analog audio signal for output, and is also configured to convert an analog audio input into a digital audio signal. The audio module 370 may be further configured to code and decode audio signals. In some embodiments, the audio module 370 may be disposed in the processor 310, or some functional modules in the audio module 370 are disposed in the processor 310.

The speaker 370A, also referred to as a "speaker", is configured to convert an audio electrical signal into a sound signal. The electronic device 300 may be used to listen to music or a hands-free call through the speaker 370A.

The receiver 370B, also referred to as an "earpiece", is configured to convert an audio electrical signal into a sound signal. When the electronic device 300 receives a call or voice information, a voice may be received by placing the receiver 370B close to an ear.

The microphone 370C, also referred to as a "mike" or a "mic", is configured to convert a sound signal into an electrical signal. When making a call or sending a voice message, a user may place the mouth of the user near the microphone 370C to make a sound, to input a sound signal to the microphone 370C. The electronic device 300 may be provided with at least one microphone 370C. In some other embodiments, the electronic device 300 may be provided with two microphones 370C, so that a noise reduction function can be further implemented in addition to sound signal collection. In some other embodiments, the electronic device 300 may be alternatively provided with three, four, or more microphones 370C, to collect a sound signal, reduce noise, identify a sound source, implement a directional recording function, and the like.

The headset jack 370D is configured to connect to a wired headset. The headset jack 370D may be the USB interface 330, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 380A is configured to sense a pressure signal, and can convert the pressure signal into an electrical signal. In some embodiments, the pressure sensor 380A may be disposed in the display 394. There are many types of pressure sensors 380A, for example, a resistive pressure sensor, an inductive pressure sensor, and a capacitive pressure sensor. The capacitive pressure sensor may include at least two parallel plates made of conductive materials. When a force is applied to the pressure sensor 380A, a capacitance between electrodes changes. The electronic device 300 determines pressure strength based on the change of the capacitance. When a touch operation is performed on the display 394, the electronic device 300 detects intensity of the touch operation through the pressure sensor 380A. The electronic device 300 may also calculate a touch location based on a detection signal of the pressure sensor 380A.

In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating a new SMS message is executed.

The gyroscope sensor 380B may be configured to determine a motion posture of the electronic device 300. In some embodiments, an angular velocity of the electronic device 300 around three axes (namely, x, y, and z axes) may be determined by using the gyroscope sensor 380B. The gyroscope sensor 380B may be configured for stabilization during photographing. For example, when the shutter is opened, the gyroscope sensor 380B detects an angle at which the electronic device 300 jitters, obtains, through calculation based on the angle, a distance for which a lens module needs to compensate, and allows the lens to cancel the jitter of the electronic device 300 through reverse motion, to implement the image stabilization. The gyroscope sensor 380B may also be used in a navigation scenario and a somatic game scenario.

The barometric pressure sensor 380C is configured to measure barometric pressure. In some embodiments, the electronic device 300 calculates an altitude based on a value of the barometric pressure measured by the barometric pressure sensor 380C, to assist positioning and navigation.

The magnetic sensor 380D includes a Hall sensor. The electronic device 300 may detect opening or closure of a flip leather cover by using the magnetic sensor 380D. In some embodiments, when the electronic device 300 is a clamshell phone, the electronic device 300 may detect opening/closing of a flip cover through the magnetic sensor 380D. Further, a feature, for example, automatic unlocking upon opening of the flip cover is set based on a detected opening or closing state of the flip cover.

The acceleration sensor 380E may detect magnitude of accelerations of the electronic device 300 in various directions (usually on three axes), and When the electronic device 300 is stationary, the acceleration sensor 380E may detect a magnitude and a direction of gravity. The acceleration sensor 180E may be further configured to identify a posture of the electronic device, and is used in an application such as switching between a landscape mode and a portrait mode or a pedometer.

The distance sensor 380F is configured to measure a distance. The electronic device 300 may measure a distance by infrared or laser light. In some embodiments, in a photographing scenario, the electronic device 300 may measure a distance through the distance sensor 380F to implement quick focusing.

For example, the optical proximity sensor 380G may include a light-emitting diode (LED) and an optical detector, for example, a photodiode. The light-emitting diode may be an infrared light-emitting diode. The electronic device 300 emits infrared light through the light emitting diode. The electronic device 300 uses the photodiode to detect infrared reflected light from a nearby object. When sufficient reflected light is detected, it may be determined that there is an object near the electronic device 300. When insufficient reflected light is detected, the electronic device 300 may determine that there is no object near the electronic device 300. The electronic device 300 can detect, by using the proximity sensor 380G, that the user holds the electronic device 300 close to an ear to make a call, and then can automatically turn off a screen for power saving. The optical proximity sensor 380G may also be used in a smart cover mode or a pocket mode to automatically perform screen unlocking or locking.

The ambient light sensor 380L is configured to sense ambient light brightness. The electronic device 300 may adaptively adjust brightness of the display 394 based on the perceived ambient light brightness. The ambient light sensor 380L may also be configured to automatically adjust white balance during photographing. The ambient light sensor 380L may also cooperate with the optical proximity sensor 380G to detect whether the electronic device 300 is in a pocket, to avoid an accidental touch.

The fingerprint sensor 380H is configured to collect a fingerprint. The electronic device 300 may implement fingerprint unlocking, access to an application lock, fingerprint-based photographing, fingerprint-based call answering, and the like based on features of the collected fingerprint.

The temperature sensor 380J is configured to detect a temperature. In some embodiments, the electronic device 300 executes a temperature processing policy by using the temperature detected by the temperature sensor 380J. For example, when the temperature reported by the temperature sensor 380J exceeds a threshold, the electronic device 300 performs performance reduction on a processor located near the temperature sensor 380J, to reduce power consumption and perform thermal protection. In some other embodiments, when the temperature is lower than another threshold, the electronic device 300 heats the battery 342, to avoid abnormal shutdown of the electronic device 300 caused by the low temperature. In some other embodiments, when the temperature is lower than still another threshold, the electronic device 300 boosts an output voltage of the battery 342 to avoid abnormal shutdown caused by the low temperature.

The touch sensor 380K may also be referred to as a "touch panel". The touch sensor 380K may be disposed in the display 394. The touch sensor 380K and the display 394 form a touchscreen, which is also referred to as a "touch screen". The touch sensor 380K is configured to detect a touch operation on or near the touch sensor 380K. The touch sensor may transfer the detected touch operation to the application processor to determine a type of the touch event. A visual output related to the touch operation may be provided through the display 394. In some other embodiments, the touch sensor 380K may alternatively be disposed on a surface of the electronic device 300, and a location of the touch sensor 380K is different from a location of the display 394.

The bone conduction sensor 380M may obtain a vibration signal. In some embodiments, the bone conduction sensor 380M may obtain a vibration signal of a human bone block for vocal vibration. The bone conduction sensor 380M may also come into contact with a pulse of a human body and receive a blood pressure pulse signal.

In some embodiments, the bone conduction sensor 380M may also be disposed in the headset, to obtain a bone conduction headset. The audio module 370 may obtain a speech signal through parsing based on the vibration signal that is of the vibration bone of the vocal-cord part and that is obtained by the bone conduction sensor 380M, to implement a speech function. The application processor may parse heart rate information based on the blood pressure beating signal obtained by the bone conduction sensor 380M, to implement a heart rate detection function.

The button 390 includes a power button, a volume button, and the like. The button 390 may be a mechanical button, may be a touch button. The electronic device 300 may receive a button input to generate a button signal input related to user settings and function control of the electronic device 300.

The motor 391 may generate a vibration prompt. The motor 391 may be configured to produce an incoming call vibration prompt and a touch vibration feedback. For example, touch operations performed on different applications (for example, a photographing application and an audio playing application) may correspond to different vibration feedback effects. The motor 391 may also correspond to different vibration feedback effects for touch operations performed on different areas of the display 394. Different application scenarios (for example, a time reminder, information receiving, an alarm clock, and a game) may also correspond to different vibration feedback effects. A touch vibration feedback effect may be further customized.

The indicator 392 may be an indicator light, and may be configured to indicate a charging status and a power change, or may be configured to indicate a message, a missed call, a notification, and the like.

The SIM card interface 395 is configured to connect to a SIM card. The SIM card may be inserted into or removed from the SIM card interface 395, to implement contact with and separation from the electronic device 300. The electronic device 300 may support one or N SIM card interfaces, where N is a positive integer greater than 1. The SIM card interface 395 may support a nano-SIM card, a micro SIM card, a SIM card, and the like. A plurality of cards may be inserted into a same SIM card interface 395 at the same time. The plurality of cards may be of a same type or different types. The SIM card interface 395 may be compatible with different types of SIM cards. The SIM card interface 395 may further be compatible with an external storage card. The electronic device 300 interacts with a network through the SIM card, to implement functions such as conversation and data communication. In some embodiments, the electronic device 300 uses an eSIM, namely, an embedded SIM card. The eSIM card may be embedded into the electronic device 300, and cannot be separated from the electronic device 300.

Figure 4:
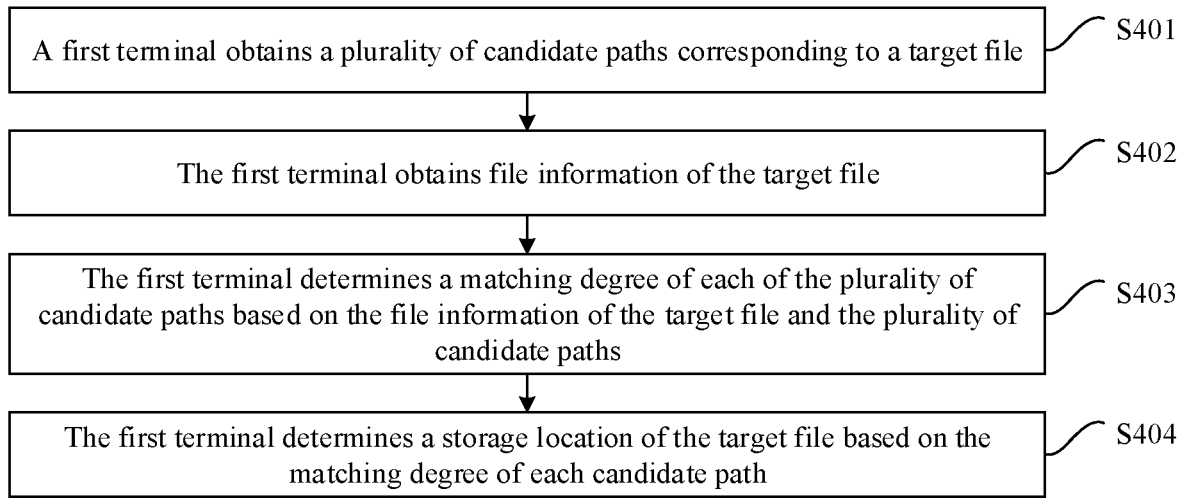
FIG. 4 is a schematic flowchart of steps of a file storage location determining method according to an embodiment of this application.

FIG. 4 is a schematic flowchart of steps of a file storage location determining method according to an embodiment of this application. The method may specifically include the following steps.

S401: A first terminal obtains a plurality of candidate paths corresponding to a target file.

For example, the first terminal may be the first electronic device 10 shown in FIG. 2.

In this embodiment of this application, the target file may be a file that is determined by the first terminal and that is sent to a second terminal. For example, the target file may be one or more of an electronic document, a spreadsheet, a picture, a web page, or a short video.

Each candidate path corresponding to the target file may point to one file storage location. The file storage location may be a file storage location for storing the target file, or may be a file storage location of another file. In other words, a plurality of file storage locations indicated by the plurality of candidate paths may include the storage location of the another file in addition to an actual storage location of the target file.

It should be noted that the storage location pointed to by the candidate path may be a location in an internal storage device of the first terminal, or may be a location in an external storage device of the first terminal. For example, the first terminal may be connected to an external storage device, and the target file may be stored in the external storage device.

In a possible embodiment, before S401, the method provided in this embodiment of this application may further include: The first terminal determines a to-be-transmitted target file.

Figure 5:
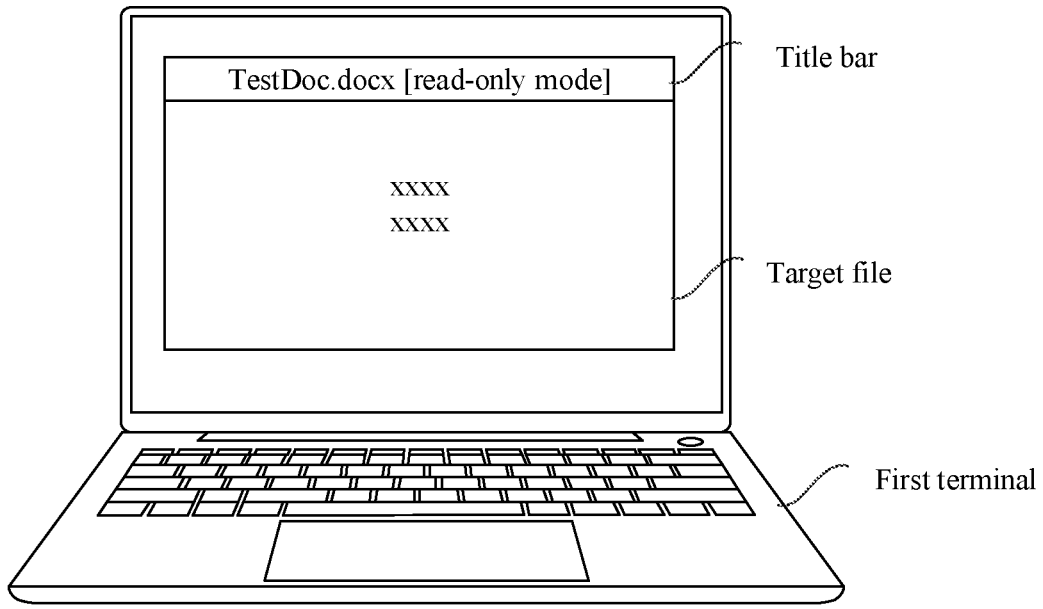
FIG. 5 is a schematic diagram of a file in an open state according to an embodiment of this application.

In an example of this embodiment of this application, that the first terminal determines the to-be-transmitted target file may be implemented in the following manner: The first terminal responds to a click operation performed by a user on the target file, and determines the target file based on the click operation. For example, the target file is an electronic document (for example, Test Doc.docx). In response to a click operation performed by the user on a file (for example, Test Doc.docx), as shown in FIG. 5, the first terminal opens the file (for example, TestDoc.docx). The first terminal may determine the file as the target file to be sent to the second terminal.

It should be noted that, in a scenario in which the first terminal determines the target file based on a click operation of the user, when the click operation has a meaning of opening the target file, the first terminal may open the target file. Certainly, when the click operation does not have a meaning of opening the target file, a step of performing, by the first terminal, an operation of opening the target file may be omitted.

In this embodiment of this application, opening a file by the first terminal may mean that the file is displayed on a display interface of the terminal (as shown in FIG. 5), or the file is displayed on a device having a display function and connected to the first terminal, or the file runs as a background program.

In another example of this embodiment of this application, that the first terminal determines the to-be-transmitted target file may be implemented in the following manner: The first terminal receives a file transfer instruction from the second terminal. The file transfer instruction carries an identifier of the to-be-transmitted file. The first terminal determines, as the target file, a file indicated by the identifier of the to-be-transmitted file.

It should be noted that, in a scenario in which the first terminal determines the target file based on the file transfer instruction of the second terminal, although the first terminal can determine which file the target file is, the first terminal may not determine the storage location of the target file.

S402: The first terminal obtains file information of the target file.

In this embodiment of this application, the file information of the target file may be used to indicate a feature of the target file. For example, the file information of the target file may include a file name, a file name extension, and the like of the target file.

In an example of this embodiment of this application, the first terminal may obtain the file information of the target file by obtaining window information of the opened target file. For example, with reference to FIG. 5, the window information of the target file opened in the first terminal may be information displayed in a title bar at the top of the file, namely, "TestDoc.docx [read-only mode]" in FIG. 5. The window information includes the file name "TestDoc" and the file name extension "docx [read-only mode]" of the opened file. Certainly, for different files and terminals, the window information may be displayed at different locations. For example, the window information may alternatively be displayed in a sidebar or a bottom bar of the target file. This is not limited in this embodiment of this application.

S403: The first terminal determines a matching degree of each of the plurality of candidate paths based on the file information of the target file and the plurality of candidate paths.

The matching degree of any candidate path is used to reflect a possibility that a file storage location corresponding to the candidate path is the storage location of the target file.

It may be understood that matching degrees of different candidate paths may be the same or different. This is not limited in this embodiment of this application.

Specifically, for example, the plurality of candidate paths include a candidate path 1 and a candidate path 2. The first terminal determines a matching degree of the candidate path 1 based on the file information of the target file and information included in the candidate path 1. The first terminal determines a matching degree of the candidate path 2 based on the file information of the target file and information included in the candidate path 2.

For example, a candidate path is "C:\Users\user1\Desktop\TestDoc.docx". The candidate path may indicate that the C drive includes a folder whose file name is "Users", and the folder "Users" successively includes two folders whose file names are "user1" and "Desktop". The "Desktop" folder is a subfolder under the "user1" folder. The "Desktop" folder stores a file named "TestDoc.docx". Therefore, a location corresponding to the candidate path is the "Desktop" folder. A matching degree of the candidate path may also indicate a possibility that the target file is stored in the "Desktop" folder.

S404: The first terminal determines the storage location of the target file based on the matching degree of each candidate path.

In this embodiment of this application, S404 may be implemented in the following manner: The first terminal determines, as the storage location of the target file, a file storage location corresponding to a candidate path with a highest matching degree in matching degrees of each candidate path.

If matching degrees of two or more candidate paths in the plurality of candidate paths are the same, and the matching degrees of the two or more candidate paths are highest, the first terminal may determine, based on a priority of each candidate path in the two or more candidate paths, a candidate path with a highest priority from the two or more candidate paths, and then determine, as the storage location of the target file, a file storage location corresponding to the candidate path with a highest priority.

Alternatively, the first terminal may determine the storage location of the target file in the following manner: The first terminal determines a plurality of candidate paths whose matching degrees are greater than or equal to a preset matching degree threshold, and determines, as the storage location of the target file, a location corresponding to a candidate path with a highest priority in the plurality of candidate paths.

For example, the matching degree that is of each candidate path and that is obtained by the first terminal through calculation includes a first matching degree, a second matching degree, and a third matching degree, and the preset matching degree threshold is the second matching degree. In this case, the first terminal may select, from candidate paths that are greater than or equal to a second matching degree threshold (namely, the first matching degree and the second matching degree), a location corresponding to a path with a highest priority as the storage location of the target file.

After determining the storage location of the target file, the first terminal may obtain the target file from the storage location, and transmit the target file to the second terminal by using an established communication connection.

In this embodiment of this application, the first terminal may calculate the matching degree of each candidate path by obtaining the plurality of candidate paths of the target file and with reference to the file information of the target file. Because the matching degree may be used to indicate a possibility that a location corresponding to each candidate path belongs to an actual storage location of the target file, the first terminal may determine the storage location of the target file based on the matching degree. In this embodiment of this application, a plurality of candidate paths are obtained, to improve a success rate of path obtaining. On this basis, a possibility that the location corresponding to each candidate path belongs to the file storage location is determined with reference to the file information of the target file. This improves accuracy of determining the file storage location. Even in a scenario in which a plurality of files are opened in a single process, an application that opens the target file is not activated, or the target file is protected, the storage location of the target file can be accurately determined by using the foregoing method. In actual application, the foregoing method can be used to increase a success rate of determining the file storage location to more than 95%.

In a possible implementation, S401 in this embodiment of this application may be implemented in the following manner: The first terminal may obtain the plurality of candidate paths corresponding to the target file in one or more manners.

Figure 6:
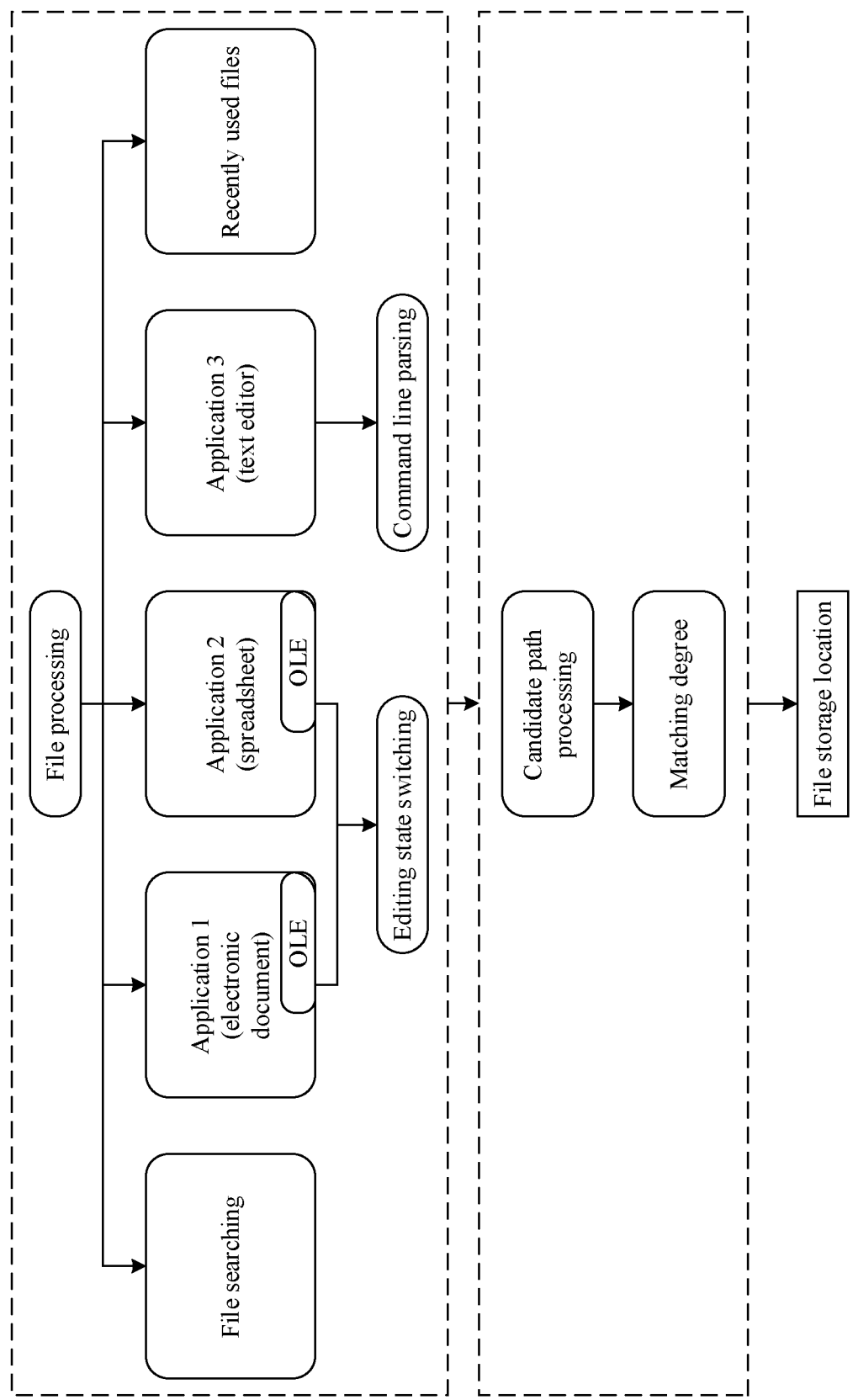
FIG. 6 is a schematic diagram in which a file storage location is determined according to an embodiment of this application.

As shown in FIG. 6, the first terminal may separately obtain information about the plurality of candidate paths corresponding to the target file in one or more manners such as OLE interface invoking, file searching, reading of information about recently used files, and command line parsing.

It may be understood that at least one candidate path may be obtained in each of the manners shown in FIG. 6.

Figure 7:
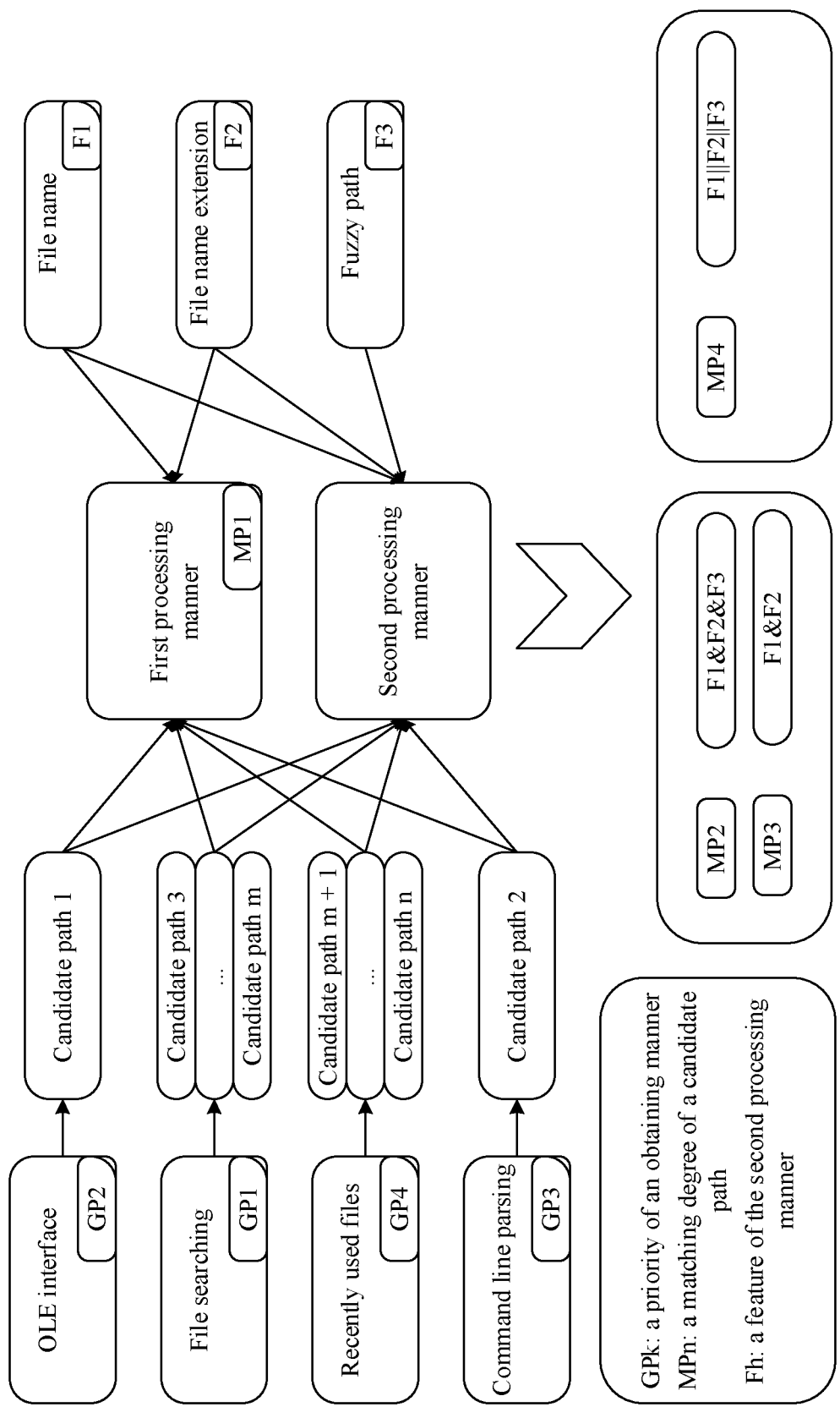
FIG. 7 is a schematic diagram in which a matching degree of a candidate path is determined according to an embodiment of this application.

In one aspect, as shown in FIG. 7, the first terminal may obtain the plurality of candidate paths corresponding to the target file in one manner. For example, the manner of file searching is used. The plurality of candidate paths determined by the first terminal in the manner of file searching include a candidate path 3 to a candidate path m.

In another aspect, as shown in FIG. 7, the first terminal may obtain the plurality of candidate paths corresponding to the target file in a plurality of different manners. For example, candidate paths determined by the first terminal in the manner of file searching include the candidate path 3 to the candidate path m, and candidate paths determined by the first terminal in the manner of OLE invoking interface include the candidate path 1. Finally, the plurality of candidate paths determined by the first terminal include the candidate path 1 and the candidate path 3 to the candidate path m. In other words, the first terminal may determine at least one candidate path obtained in each target manner as the plurality of candidate paths.

In a possible implementation, the plurality of candidate paths in this embodiment of this application are candidate paths determined from n candidate paths. The n candidate paths are candidate paths obtained by the first terminal in one or more manners.

The following describes a relationship between the n candidate paths and the plurality of candidate paths in Case 1 and Case 2.

Case 1: The plurality of candidate paths may be some of the n candidate paths.

For example, as shown in FIG. 7, there are n candidate paths (namely, the candidate path 1, the candidate path 2, . . . , the candidate path m, . . . , a candidate path n) obtained by the first terminal in a plurality of manners, where n is an integer greater than or equal to 2, and m is an integer greater than 1 and less than or equal to n. The candidate path obtained by the first terminal through an OLE interface is the candidate path 1. The candidate path obtained by the first terminal through command line parsing is the candidate path 2. The candidate paths obtained by the first terminal through file searching are the candidate path 3 to the candidate path m. The candidate paths obtained by the first terminal through reading of information about recently used files are a candidate path m+1 to the candidate path n.

In Case 1, the plurality of candidate paths may be the candidate path 3 to the candidate path m. Alternatively, the plurality of candidate paths may be the candidate path m+1 to the candidate path n. Alternatively, the plurality of candidate paths may be some paths in the candidate path 3 to the candidate path m and some or all paths in the candidate path m+1 to the candidate path n. This is not limited in this embodiment of this application.

It may be understood that, in Case 1, the first terminal obtains the plurality of candidate paths by filtering the n candidate paths. This can reduce a calculation amount of subsequent processing by the first terminal.

A manner in which the first terminal obtains the plurality of candidate paths by filtering the n candidate paths is not limited in this embodiment of this application. For example, the manner of file searching is used. If the first terminal obtains the candidate paths in the manner of file searching, the first terminal may delete a candidate path that includes a character string such as a garbled character, to obtain the plurality of candidate paths.

For example, the target file whose file name is "TestDoc" is used. After file searching by using the file name as a keyword, the first terminal may obtain the following candidate path 3 to candidate path m:

Candidate path 3: C:\Users\user1\AppData\Roaming\Microsoft\Word\ "Automatic Recovery" Save Normal.as$;

Candidate path 4: C:\Users\user1\AppData\Local\Microsoft\Windows\INet Cache\Content.Word\~WRS {B0472BFC-E53E-46BF-B286-FF03A4879860}.tmp;

Candidate path 5: C:\Users\user1\Desktop\TestDoc.docx;

Candidate path 6: C:\Users\user1\AppData\Local\Microsoft\Office\ Word15.customUI;

Candidate path 7: C:\Users\Local~1\AppData\Local\Temp~DFF7CC7BB236 82027C.TMP; . . . .

Candidate path m: C:\Users\user1\Desktop\~$TestDoc.docx.

The first terminal filters the candidate path 3 to the candidate path m to obtain a candidate path 11 and a candidate path 12 that may be used as the plurality of candidate paths:

Candidate path 11 (the path 3 before filtering): C:\Users\user1\Desktop\TestDoc.docx;

Candidate path 12 (the path 6 before filtering): C:\Users\user1\Desktop\~$TestDoc.docx.

Case 2: The plurality of candidate paths may be all candidate paths in the n candidate paths.

With reference to the example in Case 1, the n candidate paths may be the candidate path 3 to the candidate path m.

In a possible implementation, S403 in this embodiment of this application may be implemented in the following manner: The first terminal processes the file information of the target file in a first processing manner and/or a second processing manner, to obtain a processing result. The first terminal determines the matching degree of each candidate path based on the processing result and each candidate path.

Precision of the first processing manner is higher than precision of the second processing manner. The first processing manner may be referred to as exact processing, and the second processing manner may be referred to as fuzzy processing.

Figure 8:
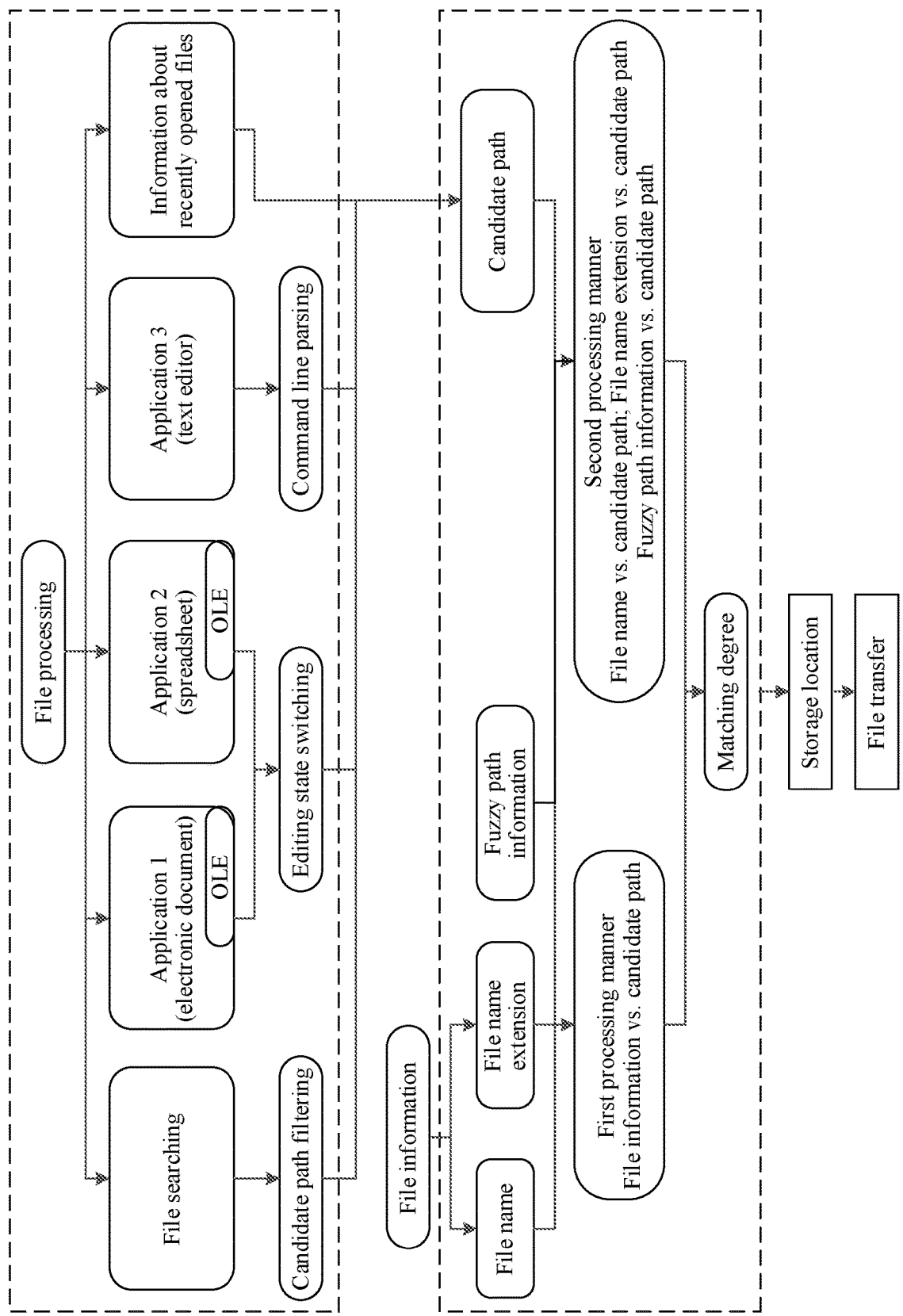
FIG. 8 is a schematic diagram of a file transfer process according to an embodiment of this application.

Refer to FIG. 7 and FIG. 8. The matching degree of each candidate path may be represented by MPn, where n is a quantity of candidate paths.

In one aspect, in this embodiment of this application, when the first terminal determines the matching degree of each candidate path in the first processing manner, the first terminal may process the obtained file information of the target file into a corresponding complete character string (namely, the foregoing processing result) and compare the character string with information included in each candidate path, to determine whether each candidate path includes the character string.

For example, a character string corresponding to the file information of the target file may be represented as "TestDoc.docx [read-only mode]". The first terminal may compare the character string with each of the plurality of candidate paths, to determine whether one or more candidate paths in the plurality of candidate paths include the character string "TestDoc.docx [read-only mode]".

For example, the plurality of candidate paths include a candidate path x, and the candidate path x is "C:\Users\user1\Desktop\TestDoc.docx". After comparing the character string "TestDoc.docx [read-only mode]" with the candidate path x, the first terminal may determine that the candidate path x does not include the character string corresponding to the file information. Then, the first terminal determines that a matching degree of the candidate path x is the first matching degree.

For example, the plurality of candidate paths include a candidate path x, and the candidate path x is "C:\Users\user1\Desktop\TestDoc.docx [read-only mode]". After comparing the character string "TestDoc.docx [read-only mode]" with the candidate path x, the first terminal may determine that the candidate path x includes the character string corresponding to the file information. Then, the first terminal determines that a matching degree of the candidate path x is the second matching degree. The first matching degree is lower than the second matching degree. In other words, in a scenario in which the first terminal determines the matching degree of the candidate path in the first processing manner, a matching degree of a candidate path including the character string corresponding to the file information is higher than a matching degree of a candidate path excluding the character string corresponding to the file information.

In another aspect, when the first terminal determines the matching degree of each candidate path in the second processing manner, the first terminal may split the character string corresponding to the file information of the target file into a plurality of substrings (namely, the foregoing processing result). Each substring may be considered as a feature Fh of the second processing manner. In other words, the plurality of substrings may also be referred to as a plurality of features. Then, the first terminal separately compares at least one feature in the plurality of features with each candidate path, to determine whether each candidate path includes the at least one feature in the plurality of features.

For example, if the character string corresponding to the file information of the target file may be represented as "TestDoc.docx [read-only mode]", when the first terminal determines the matching degree of each candidate path in the second processing manner, the first terminal may determine that the plurality of features corresponding to the target file may include F1: "TestDoc" and F2: "docx [read-only mode]". "TestDoc" indicates the file name of the target file, and "docx [read-only mode]" indicates the file name extension of the target file.

In a possible implementation of this embodiment of this application, when the first terminal processes each candidate path in the second processing manner, the feature of the second processing manner may further include F3, namely, a fuzzy path obtained by the first terminal by reading a background process of the target file. For example, the fuzzy path corresponding to the target file can be represented as F3: "C:\Users\user1\Desktop\TestDoc.docx".

Then, the first terminal may compare each feature with each candidate path, and determine whether the candidate path includes the one or more features.

For example, the file information is "TestDoc.docx [read-only mode]". The first terminal may split the file information into two substrings "TestDoc" and "docx [read-only mode]". The substring "TestDoc" represents the file name of the target file, and may be used as the first feature F1 of the second processing manner. The substring "docx [read-only mode]" represents the file name extension of the target file, and may be used as the second feature F2 of the second processing manner. The first terminal may obtain, by reading the background process, the fuzzy path "C:\Users\user1\Desktop\TestDoc.docx" of the target file as the third feature F3. Then, the first terminal may separately compare the plurality of features with path information of each candidate path. If the candidate path is "C:\Users\user1\Desktop\TestDoc.docx", the first terminal may determine through comparison that the candidate path includes the first feature F1 and the third feature F3, but does not include the second feature F2.

It should be noted that the first processing manner and the second processing manner may be used independently or in combination. For example, the first terminal may first use the first processing manner to compare the character string corresponding to the file information as a whole with each candidate path. If one or more candidate paths in the plurality of candidate paths include the character string, a process of performing processing in the second processing manner may be omitted. If the first terminal does not find any candidate path including the character string from the plurality of candidate paths in the first processing manner, after using the first processing manner, the first terminal may continue to use the second processing manner to determine the plurality of features of the target file. After obtaining the plurality of features of the target file, the first terminal compares each feature with the plurality of candidate paths, to find a candidate path including one or more features. Certainly, the first terminal may first use the second processing manner to compare each feature with each candidate path, and then use the first processing manner. A sequence of using the first processing manner and the second processing manner is not limited in this embodiment of this application.

In this embodiment of this application, after the first terminal processes the file information of the target file in the first processing manner and/or the second processing manner, the first terminal may determine the matching degree, namely, MPn in FIG. 7, of each candidate path based on a relationship (for example, whether the above processing result is included in the path) between a processing result and each candidate path.

In specific implementation, that the first terminal determines the matching degree of each candidate path based on the processing result may include:

If the first terminal finds, in the first processing manner, that path information of one or more candidate paths includes the character string corresponding to the file information of the target file, the first terminal may determine a matching degree of the candidate path including the character string is the first matching degree, namely, MP1 in FIG. 7. The first matching degree MP1 is greater than a preset threshold.

If the path information of the candidate path includes all of the plurality of features corresponding to the target file, the first terminal may determine a matching degree of the candidate path including all the features as the second matching degree, namely, MP2 in FIG. 7.

If the path information of the candidate path includes some of the plurality of features corresponding to the target file, the first terminal may determine a matching degree of the candidate path including some features is the third matching degree, namely, MP3 in FIG. 7.

If the path information of the candidate path includes only any one of the plurality of features corresponding to the target file, the first terminal may determine a matching degree of the candidate path including only any one of the features is a fourth matching degree, namely, MP4 in FIG. 7.

For example, if the candidate path includes the character string "TestDoc.docx [read-only mode]" in the foregoing example, the first terminal may determine the matching degree of the candidate path as the first matching degree MP1. If a candidate path includes the plurality of features of the target file, for example, the candidate path includes the features F1: "TestDoc", F2: "docx [read-only mode]", and F3: "C:\Users\user1\Desktop\TestDoc.docx" in the foregoing example, the first terminal may determine a matching degree of the candidate paths as the second matching degree MP2. The second matching degree MP2 is less than the first matching degree MP1. If a candidate path includes only some of the plurality of features of the target file, for example, the candidate path includes the features F1: "TestDoc" and F2: "docx [read-only mode]" in the foregoing example, but does not include the feature F3: "C:\Users\user1\Desktop\TestDoc.docx", the first terminal may determine a matching degree of the candidate path as the third matching degree MP3. The third matching degree MP3 is less than the second matching degree MP2. If information about a candidate path includes only any one of the foregoing features, for example, the candidate path includes only the features F1: "TestDoc", F2: "docx [read-only mode]", and F3: "C:\Users\user1\Desktop\TestDoc.docx" in the foregoing example, the first terminal may determine a matching degree of the candidate paths as the fourth matching degree MP4. The fourth matching degree MP4 is less than the third matching degree MP3.

In a possible implementation of this embodiment of this application, when determining a matching degree of a candidate path, the first terminal may first determine, in the first processing manner, whether the matching degree of the candidate path is the first matching degree. If the first terminal determines that a matching degree of a candidate path is the first matching degree, the first terminal may stop performing matching on the candidate path, and no longer perform matching on the candidate path in the second processing manner. The matching degree of the candidate paths is the first matching degree. If the first terminal determines, in the first processing manner, that the matching degree of the candidate path is not the first matching degree, the first terminal continues to perform matching on the candidate path in the second processing manner, to determine whether the matching degree of the candidate path is the second matching degree, the third matching degree, or the fourth matching degree.

It should be noted that, after the first terminal determines the matching degree of each candidate path in the first processing manner and/or the second processing manner, if there are a plurality of candidate paths with a highest matching degree, the first terminal may determine, based on a priority of each candidate path, a candidate path with a highest priority from the plurality of candidate paths with the highest matching degree, and then determine a location corresponding to the candidate path with the highest priority as the storage location of the target file. For example, after matching degrees of all candidate paths are calculated, if a highest matching degree of the candidate paths is the second matching degree, and there are a plurality of candidate paths with the second matching degree, the first terminal may determine a priority of each candidate path with the second matching degree, to determine a location corresponding to a candidate path with a higher priority as the file storage location.

As shown in FIG. 7, a priority of each manner of obtaining a candidate path may be indicated by GPk, where k indicates k manners of obtaining a candidate path. Correspondingly, a priority of each candidate path is the same as a priority of a manner of obtaining the candidate path. For example, for a plurality of manners of obtaining a candidate path such as an OLE interface, file searching, command line parsing, and recently used files, it is assumed that a priority GP1 of the file searching is higher than a priority GP2 of the OLE interface, the priority GP2 of the OLE interface is higher than a priority GP3 of the command line parsing, and the priority GP3 of the command line parsing is higher than a priority GP4 of the recently used files. In this case, after a plurality of candidate paths are obtained in the foregoing four manners, a priority of a candidate path obtained through the file searching should be higher than a priority of a candidate path obtained through the OLE interface, the priority of the candidate path obtained through the OLE interface is higher than a priority of a candidate path obtained through the command line parsing, and a priority of the candidate path obtained by the recently used files is the lowest.

In a possible embodiment, after step S404, the method provided in this embodiment of this application may further include: The first terminal obtains the target file based on the storage location of the target file. The first terminal sends the target file to a second terminal.

In specific implementation, the first terminal may transmit the target file to the second terminal based on an established communication connection.

For ease of understanding, the following describes the file storage location determining method in this embodiment of this application by using specific examples and with reference to FIG. 6, FIG. 7, and FIG. 8.

Example 1

For a target file in the first terminal, it is assumed that the target file is the office document in an open state in FIG. 5, and file information of the target file may be obtained through reading of information displayed in a title bar of the file, that is, the file information is work.txt.

Candidate paths obtained by the first terminal in the plurality of different manners may include:

Candidate paths obtained through the file searching:

Candidate path 1 C:\Users\user1\AppData\Roaming\Microsoft\Word "Automatic Recovery" Save Normal.as$;

Candidate path 2 C:\Windows\Fonts\StaticCache.dat;

Candidate path 3 C:\Users\user1\Desktop\TestDoc.docx;

Candidate path 4 C:\Users\user1\AppData\Local\Microsoft\Office\Word15.customUI;

Candidate path 5 C:\Users\user1\Desktop\~$TestDoc.docx;

Candidate path m ( . . . , too many search results, not enumerated completely).

Candidate path obtained through the OLE interface invoking:

Empty

Candidate path obtained through the reading of information about recently used files:

Candidate path m+1 C:\Users\user1\Desktop\work.txt;

Candidate path obtained through the command line parsing:

Candidate path n "C:\windows\system32\NOTEPAD.EXE";

C:\Users\user1\Desktop\work.txt;

For a remaining candidate path obtained by filtering out some candidate paths, there are the following cases.

Remaining candidate path obtained by preliminarily filtering out the candidate paths through the file searching:
Empty
Remaining candidate path obtained by preliminarily filtering out the candidate path through the OLE interface invoking:
Empty
Remaining candidate path obtained by preliminarily filtering out the candidate path obtained through the reading of information about recently used files:
Candidate path m+1 C:\Users\user1\Desktop\work.txt;
Remaining candidate path obtained by preliminarily filtering out the candidate path through the command line parsing:
Candidate path n "C:\windows\system32\NOTEPAD.EXE";
C:\Users\user1\Desktop\work.txt;
When the file information and each candidate path are processed in the first processing manner, a character string "work.txt" in the file information may be compared with each candidate path. A corresponding comparison result includes:
Comparison result obtained through the file searching:
Empty
Comparison result obtained through the OLE interface invoking:
Empty
Comparison result obtained through the reading of information about recently used files:
Candidate path m+1 C:\Users\user1\Desktop\work.txt;
Comparison result obtained through the command line parsing:
Candidate path n C:\Users\user1\Desktop\work.txt;
The storage location of the target file is determined based on the comparison result:
Candidate path having the first matching degree MP1: There is a match.
A priority of a manner of obtaining the candidate path is as follows: the file searching>the OLE interface invoking>the command line parsing>the reading of information about recently used files.
Therefore, a finally determined storage location of the target file is a location corresponding to the path "C:\Users\user1\Desktop\work.txt" obtained by the command line parsing.
Then, the first terminal may obtain the target file, namely, a document whose file name is "work", from the location corresponding to the path" C:\Users\user1\Desktop\work.txt", and transmit the document to the second terminal.

Example 2

It is assumed that file information of a target file is TestDoc.docx [read-only mode].
Candidate paths obtained by the first terminal in the plurality of different manners may include:
Candidate paths obtained through the file searching:
Candidate path 1
C:\Users\user1\AppData\Roaming\Microsoft\Word "Automatic Recovery" Save Normal.as$;
Candidate path 2:
C:\Users\user1\AppData\Local\Microsoft\Windows\ INetCache\Content.Word\~WRS {B0472BFC-E53E-46BF-B286-FF03A4879860}.tmp;
Candidate path 3 C:\Users\user1\Desktop\TestDoc.docx;
Candidate path 4 C:\Users\user1\AppData\Local\Microsoft\Office\Word15. customUI;
Candidate path 5
C:\Users\Local~1\AppData\Local\Temp\~DFF7CC7BB23 682027C.TMP;
Candidate path 6 C:\Users\user1\Desktop\~$TestDoc.docx;
Candidate path m ( . . . , too many search results, not enumerated completely).
Candidate path obtained through the OLE interface invoking:
Candidate path m+1 C:\Users\user1\Desktop\TestDoc.docx;
Candidate path obtained through the reading of information about recently used files:
Candidate path m+2 C:\Users\user1\Desktop\~$TestDoc.docx;
Candidate path m+3 C:\Users\user1\Desktop\TestDoc.docx;
Candidate path obtained through the command line parsing:
Candidate path n "C:\Program Files\Microsoft Office\Office15\WINWORD.EXE"/n;
C:\Users\user1\Desktop\TestDoc.docx";
For a remaining candidate path obtained by filtering out some candidate paths, there are the following cases.
Remaining candidate path obtained by preliminarily filtering out the candidate paths through the file searching:
Candidate path 3 C:\Users\user1\Desktop\TestDoc.docx;
Candidate path 6 C:\Users\user1\Desktop\~$TestDoc.docx;
Remaining candidate path obtained by preliminarily filtering out the candidate path through the OLE interface invoking:
Candidate path m+1 C:\Users\user1\Desktop\TestDoc.docx;
Remaining candidate path obtained by preliminarily filtering out the candidate path obtained through the reading of information about recently opened files:
Candidate path m+2 C:\Users\user1\Desktop\~$TestDoc.docx;
Candidate path m+3 C:\Users\user1\Desktop\TestDoc.docx;
Remaining candidate path obtained by preliminarily filtering out the candidate path through the command line parsing:
Candidate path n "C:\Program Files\Microsoft Office\Office15\WINWORD.EXE"/n;
"C:\Users\user1\Desktop\TestDoc.docx";
When the file information and each candidate path are processed in the first processing manner, a character string "TestDoc.docx [read-only mode]" in the file information may be compared with each candidate path. A corresponding comparison result includes:
Comparison result obtained through the file searching:
Empty
Comparison result obtained through the OLE interface invoking:
Empty
Comparison result obtained through the reading of information about recently used files:
Empty
Comparison result obtained through the command line parsing:
Empty
Because no matched candidate path is obtained in the first processing manner, the first terminal may continue to compare the candidate paths in the second processing manner. When the second processing manner is used, the first terminal may split the character string "TestDoc.docx [read-only mode]" into two substrings: a file name substring F1: "TestDoc" and a file name extension substring F2: "docx [read-only mode]". In addition, the first terminal reads, by using a background process, that the fuzzy path information F3 of the target file is "C:\Users\user1\Desktop\TestDoc.docx", and then separately compares the two substrings and the fuzzy path information with each candidate path. A corresponding comparison result includes:

Comparison result obtained through the file searching:
C:\Users\user1\Desktop\TestDoc.docx indicates that the file name F1 is found, the file name extension F2 is missed, and the fuzzy path F3 is found.
C:\Users\user1\Desktop\~$TestDoc.docx indicates that the file name F1 is missed, the file name extension F2 is missed, and the fuzzy path F3 is missed.

Comparison result obtained through the OLE interface invoking:
C:\Users\user1\Desktop\TestDoc.docx indicates that the file name F1 is found, the file name extension F2 is missed, and the fuzzy path F3 is found.

Comparison result obtained through the reading of information about recently used files:
C:\Users\user1\Desktop\~$TestDoc.docx indicates that the file name F1, the file name extension F2, and the fuzzy path F3 are missed.
C:\Users\user1\Desktop\TestDoc.docx indicates that the file name F1 is found, the file name extension F2 is missed, and the fuzzy path F3 is found.

Comparison result obtained through the command line parsing:
"C:\Program Files\Microsoft Office\Office15\WINWORD.EXE"/n and "C:\Users\user1\Desktop\TestDoc.docx" indicate that the file name F1 is found, the file name extension F2 is missed, and the fuzzy path F3 is found.

A storage location of the target file is determined based on the comparison result:

Candidate path having the first matching degree MP1: The file information is missed in a first comparison manner.

Candidate path having the second matching degree MP2: missed through the file name, the file name extension, and the fuzzy path.

Candidate path having the third matching degree MP3: missed through the file name and the file name extension.

Candidate path having the fourth matching degree MP4: one found through the file name and the file name extension.

A priority of a manner of obtaining the candidate path is as follows: the file searching>the OLE interface invoking>the command line parsing>the reading of information about recently used files.

Therefore, a finally determined storage location of the target file is a location corresponding to the path "C:\Users\user1\Desktop\TestDoc.docx", namely, the location corresponding to "found through the file name, missed through the file name extension, found through the fuzzy path".

Then, the first terminal may obtain the target file, namely, a document whose file name is "TestDoc", from the location corresponding to the path "C:\Users\user1\Desktop\TestDoc.docx", and transmit the document to the second terminal.

In embodiments of this application, the first terminal may be divided into functional modules based on the foregoing method examples. For example, each functional module may be obtained through division based on each corresponding function, or one or more functions may be integrated into one functional module. The integrated module may be implemented in a form of hardware, or may be implemented in a form of a software functional module. It should be noted that, in embodiments of this application, module division is an example, and is merely a logical function division. In actual implementation, another division manner may be used. An example in which each functional module is obtained through division based on each corresponding function is used below for description.

Figure 9:
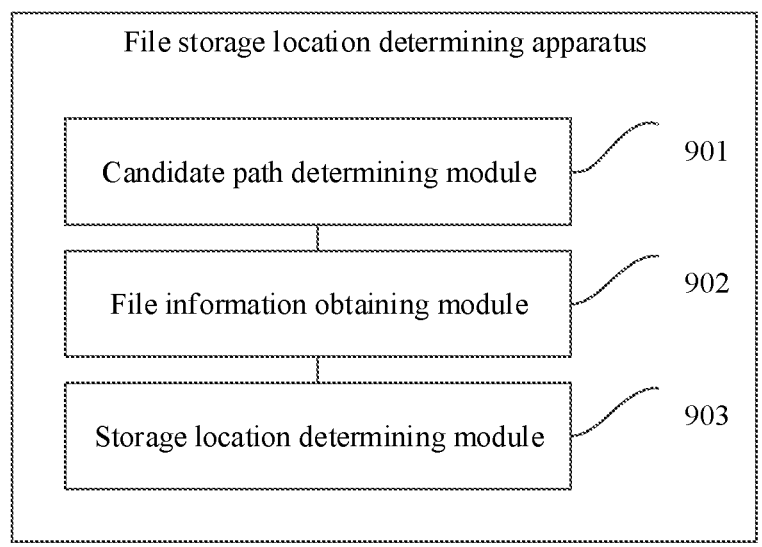
FIG. 9 is a schematic diagram of a file storage location determining apparatus according to an embodiment of this application.

FIG. 9 is a schematic diagram of a file storage location determining apparatus according to an embodiment of this application. The apparatus may be used in a first terminal. The apparatus may include a candidate path determining module 901, a file information obtaining module 902, and a storage location determining module 903.

The candidate path determining module may be configured to support the first terminal in performing the step S401, and/or used in another process of the technology described in this specification.

The file information obtaining module may be configured to support the first terminal in performing the step S402, and/or used in another process of the technology described in this specification.

The storage location determining module may be configured to support the first terminal in performing the steps S403 and S404, and/or used in another process of the technology described in this specification.

In a possible implementation of this embodiment of this application, the candidate path determining module is configured to determine a plurality of candidate paths corresponding to a target file. Each candidate path points to one file storage location. The file information obtaining module is configured to obtain file information of the target file. The storage location determining module is configured to determine, based on the file information and the plurality of candidate paths, a file storage location pointed to by a first candidate path in the plurality of candidate paths as a storage location of the target file. A matching degree of the first candidate path is a highest matching degree in matching degrees of the plurality of candidate paths.

In a possible implementation of this embodiment of this application, the candidate path determining module is configured to determine the plurality of candidate paths corresponding to the target file in one or more of the following manners: invoking an object connection and embedding interface, file searching, reading of information about recently used files, and command line parsing.

In a possible implementation of this embodiment of this application, the file information obtaining module is configured to obtain window information of the target file, where the window information is information displayed at a preset location of the target file; and determine the file information of the target file based on the window information.

In a possible implementation of this embodiment of this application, the apparatus further includes:
a matching degree determining module, configured to determine a matching degree of each of the plurality of candidate paths based on the file information.

In a possible implementation of this embodiment of this application, the matching degree determining module is configured to: process the file information of the target file in a preset first processing manner and/or a preset second processing manner, to obtain a corresponding processing result, where precision of the first processing manner is higher than precision of the second processing manner; and determine the matching degree of each of the plurality of candidate paths based on the processing result and path information included in each candidate path.

In a possible implementation of this embodiment of this application, the matching degree determining module is configured to: if path information of a second candidate path includes the processing result of the first processing manner, determine a matching degree of the second candidate path as a first matching degree, where the processing result of the first processing manner is a character string including the file information, and the second candidate path is any of the plurality of candidate paths; or if the path information of the second candidate path does not include the processing result of the first processing manner, determine the matching degree of the second candidate path based on the processing result of the second processing manner and the path information included in the second candidate path, where the processing result of the second processing manner includes a plurality of features of the target file, and each feature is in a one-to-one correspondence with each substring in the character string.

In a possible implementation of this embodiment of this application, the matching degree determining module is configured to: if a quantity of features of the target file that are included in the path information of the second candidate path is greater than or equal to a first threshold, determine the matching degree of the second candidate path as a second matching degree, where the second matching degree is less than the first matching degree; if the quantity of features of the target file that are included in the path information of the second candidate path is greater than or equal to a second threshold and less than the first threshold, determine the matching degree of the second candidate path as a third matching degree, where the third matching degree is less than the second matching degree; or if the quantity of features of the target file that are included in the path information of the second candidate path is less than the second threshold, determine, by using the first terminal, the matching degree of the second candidate path as a fourth matching degree, where the fourth matching degree is less than the third matching degree.

In a possible implementation of this embodiment of this application, the storage location determining module is configured to: if there are a plurality of candidate paths corresponding to the highest matching degree, determine a priority of each candidate path corresponding to the highest matching degree, where the priority of the candidate path is obtained based on a priority of a manner of determining the candidate path; and determine, as the storage location of the target file, a file storage location pointed to by a candidate path with a highest priority in the plurality of candidate paths corresponding to the highest matching degree.

In a possible implementation of this embodiment of this application, a priority relationship between a plurality of manners of determining the candidate path is as follows: A priority of the file searching is higher than a priority of the object linking and embedding interface invoking, the priority of the object linking and embedding interface invoking is higher than a priority of the command line parsing, and the priority of the command line parsing is higher than a priority of the reading of information about recently used files.

In a possible implementation of this embodiment of this application, the apparatus further includes:
- a target file sending module, configured to obtain the target file from the storage location, and send the target file to a second terminal.

It should be noted that all related content of the steps in the foregoing method embodiments may be cited in function description of corresponding functional modules. Details are not described herein again.

An embodiment of this application further provides a terminal. The terminal may be the first terminal in the foregoing embodiments, and includes a memory, a processor, and a computer program that is stored in the memory and that can be run on the processor. When executing the computer program, the processor implements the file storage location determining method in the foregoing embodiments.

An embodiment of this application further provides a computer-readable storage medium. The computer-readable storage medium stores computer instructions. When the computer instructions are run on a first terminal, the first terminal is enabled to perform the foregoing related method steps to implement the file storage location determining method in the foregoing embodiments.

An embodiment of this application further provides a computer program product. When the computer program product runs on a computer, the computer is enabled to perform the foregoing related steps to implement the file storage location determining method in the foregoing embodiments.

Figure 10:
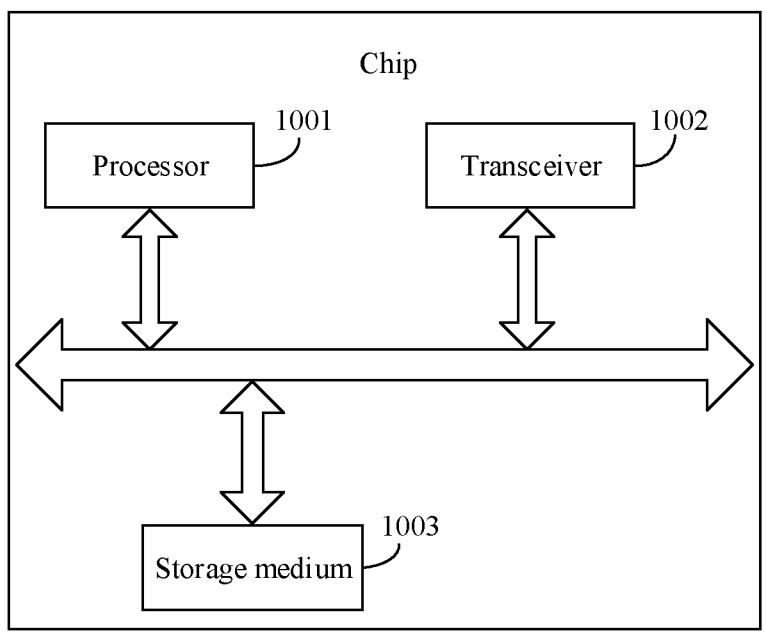
FIG. 10 is a schematic diagram of a chip according to an embodiment of this application.

FIG. 10 is a schematic diagram of a structure of a chip according to an embodiment of this application. The chip shown in FIG. 10 may be a general-purpose processor, or may be a dedicated processor. The chip includes a processor 1001. The processor 1001 is configured to support a first terminal in performing the foregoing related steps, to implement the file storage location determining method in the foregoing embodiments.

Optionally, the chip further includes a transceiver 1002. The transceiver 1002 is configured to be controlled by the processor 1001, and is configured to support the first terminal in performing the foregoing related steps, to implement the file storage location determining method in the foregoing embodiments.

Optionally, the chip shown in FIG. 10 may further include a storage medium 1003.

It should be noted that the chip shown in FIG. 10 may be implemented by using the following circuit or component: one or more field programmable gate arrays (field programmable gate array, FPGA), a programmable logic device (programmable logic device, PLD), a controller, a state machine, gate logic, a discrete hardware component, any other appropriate circuit, or any combination of circuits that can perform various functions described in this application.

With reference to the foregoing, this application provides the following embodiments.

Embodiment 1: A file storage location determining method includes:

A first terminal determines a plurality of candidate paths corresponding to a target file. Each candidate path points to one file storage location.

The first terminal obtains file information of the target file.

The first terminal determines, based on the file information and the plurality of candidate paths, a file storage location pointed to by a first candidate path in the plurality of candidate paths as a storage location of the target file. A matching degree of the first candidate path is a highest matching degree in matching degrees of the plurality of candidate paths.

Embodiment 2: According to the method in Embodiment 1, that a first terminal determines a plurality of candidate paths corresponding to a target file includes:

The first terminal determines the plurality of candidate paths corresponding to the target file in one or more of the following manners: object linking and embedding interface invoking, file searching, reading of information about recently used files, and command line parsing.

Embodiment 3: According to the method in Embodiment 1, that the first terminal obtains the file information of the target file includes:

The first terminal obtains window information of the target file. The window information is information displayed at a preset location of the target file.

The first terminal determines the file information of the target file based on the window information.

Embodiment 4: According to the method in any of Embodiments 1 to 3, the method further includes:

The first terminal determines a matching degree of each of the plurality of candidate paths based on the file information.

Embodiment 5: According to the method in Embodiment 4, that the first terminal determines the matching degree of each of the plurality of candidate paths based on the file information includes:

The first terminal processes the file information of the target file in a preset first processing manner and/or a preset second processing manner, to obtain a corresponding processing result. Precision of the first processing manner is higher than precision of the second processing manner.

The first terminal determines the matching degree of each of the plurality of candidate paths based on the processing result and path information included in each candidate path.

Embodiment 6: According to the method in Embodiment 5, that the first terminal determines the matching degree of each of the plurality of candidate paths based on the processing result and path information included in each candidate path includes:

If path information of a second candidate path includes the processing result of the first processing manner, the first terminal determines a matching degree of the second candidate path as a first matching degree. The processing result of the first processing manner is a character string including the file information, and the second candidate path is any of the plurality of candidate paths.

If the path information of the second candidate path does not include the processing result of the first processing manner, the first terminal determines the matching degree of the second candidate path based on the processing result of the second processing manner and the path information included in the second candidate path. The processing result of the second processing manner includes a plurality of features of the target file, and each feature is in a one-to-one correspondence with each substring in the character string.

Embodiment 7: According to the method in Embodiment 6, that the first terminal determines a matching degree of the second candidate path based on the processing result of the second processing manner and the path information included in the second candidate path includes:

If a quantity of features of the target file that are included in the path information of the second candidate path is greater than or equal to a first threshold, the first terminal determines the matching degree of the second candidate path as a second matching degree. The second matching degree is less than the first matching degree.

If the quantity of features of the target file that are included in the path information of the second candidate path is greater than or equal to a second threshold and less than the first threshold, the first terminal determines the matching degree of the second candidate path as a third matching degree. The third matching degree is less than the second matching degree.

If the quantity of features of the target file that are included in the path information of the second candidate path is less than the second threshold, the first terminal determines the matching degree of the second candidate path as a fourth matching degree. The fourth matching degree is less than the third matching degree.

Embodiment 8: According to the method in any of Embodiments 1 to 7, the method further includes:

If there are a plurality of candidate paths corresponding to the highest matching degree, the first terminal determines a priority of each candidate path corresponding to the highest matching degree. The priority of the candidate path is obtained based on a priority of a manner of determining the candidate path.

The first terminal determines, as the storage location of the target file, a file storage location pointed to by a candidate path with a highest priority in the plurality of candidate paths corresponding to the highest matching degree.

Embodiment 9: According to the method in Embodiment 8, a priority relationship between a plurality of manners of determining the candidate path is as follows:

A priority of the file searching is higher than a priority of the object linking and embedding interface invoking, the priority of the object linking and embedding interface invoking is higher than a priority of the command line parsing, and the priority of the command line parsing is higher than a priority of the reading of information about recently used files.

Embodiment 10: According to the method in Embodiment 8, the method further includes:

The first terminal obtains the target file from the storage location.

The first terminal sends the target file to a second terminal.

Embodiment 11: A file storage location determining apparatus is applied to a first terminal. The apparatus includes:
  a candidate path determining module, configured to determine a plurality of candidate paths corresponding to a target file, where each candidate path points to one file storage location;
  a file information obtaining module, configured to obtain file information of the target file; and
  a storage location determining module, configured to determine, based on the file information and the plurality of candidate paths, a file storage location pointed to by a first candidate path in the plurality of candidate paths as a storage location of the target file, where a matching degree of the first candidate path is a highest matching degree in matching degrees of the plurality of candidate paths.

Embodiment 12: According to the apparatus in Embodiment 11, the candidate path determining module is configured to determine the plurality of candidate paths corresponding to the target file in one or more of the following manners: invoking an object connection and embedding interface, file searching, reading of information about recently used files, and command line parsing.

Embodiment 13: According to the apparatus in Embodiment 11, the file information obtaining module is configured to obtain window information of the target file, where the window information is information displayed at a preset location of the target file; and determine the file information of the target file based on the window information.

Embodiment 14: According to the apparatus in any of Embodiments 11 to 13, the apparatus further includes:

a matching degree determining module, configured to determine a matching degree of each of the plurality of candidate paths based on the file information.

Embodiment 15: According to the apparatus in Embodiment 14, the matching degree determining module is configured to: process the file information of the target file in a preset first processing manner and/or a preset second processing manner, to obtain a corresponding processing result, where precision of the first processing manner is higher than precision of the second processing manner; and determine the matching degree of each of the plurality of candidate paths based on the processing result and path information included in each candidate path.

Embodiment 16: According to the apparatus in Embodiment 15, the matching degree determining module is configured to: if path information of a second candidate path includes the processing result of the first processing manner, determine, by using the first terminal, a matching degree of the second candidate path as a first matching degree, where the processing result of the first processing manner is a character string including the file information, and the second candidate path is any of the plurality of candidate paths; or if the path information of the second candidate path does not include the processing result of the first processing manner, determine, by using the first terminal, the matching degree of the second candidate path based on the processing result of the second processing manner and the path information included in the second candidate path, where the processing result of the second processing manner includes a plurality of features of the target file, and each feature is in a one-to-one correspondence with each substring in the character string.

Embodiment 17: According to the apparatus in Embodiment 16, the matching degree determining module is configured to: if a quantity of features of the target file that are included in the path information of the second candidate path is greater than or equal to a first threshold, determine, by using the first terminal, the matching degree of the second candidate path as a second matching degree, where the second matching degree is less than the first matching degree; if the quantity of features of the target file that are included in the path information of the second candidate path is greater than or equal to a second threshold and less than the first threshold, determine, by using the first terminal, the matching degree of the second candidate path as a third matching degree, where the third matching degree is less than the second matching degree; or if the quantity of features of the target file that are included in the path information of the second candidate path is less than the second threshold, determine, by using the first terminal, the matching degree of the second candidate path as a fourth matching degree, where the fourth matching degree is less than the third matching degree.

Embodiment 18: According to the apparatus in any of Embodiments 11 to 17, the storage location determining module is configured to: if there are a plurality of candidate paths corresponding to the highest matching degree, determine, by using the first terminal, a priority of each candidate path corresponding to the highest matching degree, where the priority of the candidate path is obtained based on a priority of a manner of determining the candidate path; and determine, by using the first terminal as the storage location of the target file, a file storage location pointed to by a candidate path with a highest priority in the plurality of candidate paths corresponding to the highest matching degree.

Embodiment 19: According to the apparatus in Embodiment 18, a priority relationship between a plurality of manners of determining the candidate path is as follows:

A priority of the file searching is higher than a priority of the object linking and embedding interface invoking, the priority of the object linking and embedding interface invoking is higher than a priority of the command line parsing, and the priority of the command line parsing is higher than a priority of the reading of information about recently used files.

Embodiment 20: According to the apparatus in Embodiments 18, the apparatus further includes:

a target file sending module, configured to obtain the target file from the storage location, and send the target file to a second terminal.

Embodiment 21: A terminal includes a memory, a processor, and a computer program that is stored in the memory and that can be run on the processor. When executing the computer program, the processor implements the following steps.

A first terminal determines a plurality of candidate paths corresponding to a target file. Each candidate path points to one file storage location.

The first terminal obtains file information of the target file.

The first terminal determines, based on the file information and the plurality of candidate paths, a file storage location pointed to by a first candidate path in the plurality of candidate paths as a storage location of the target file. A matching degree of the first candidate path is a highest matching degree in matching degrees of the plurality of candidate paths.

Embodiment 22: According to the terminal in Embodiment 21, when executing the computer program, the processor further implements the following steps.

The first terminal determines the plurality of candidate paths corresponding to the target file in one or more of the following manners: object linking and embedding interface invoking, file searching, reading of information about recently used files, and command line parsing.

Embodiment 23: According to the terminal in Embodiment 21, when executing the computer program, the processor further implements the following steps.

The first terminal obtains window information of the target file. The window information is information displayed at a preset location of the target file.

The first terminal determines the file information of the target file based on the window information.

Embodiment 24: According to the terminal in any of Embodiments 21 to 23, when executing the computer program, the processor further implements the following steps:

The first terminal determines a matching degree of each of the plurality of candidate paths based on the file information.

Embodiment 25: According to the terminal in Embodiment 24, when executing the computer program, the processor further implements the following steps.

The first terminal processes the file information of the target file in a preset first processing manner and/or a preset second processing manner, to obtain a corresponding processing result. Precision of the first processing manner is higher than precision of the second processing manner.

The first terminal determines the matching degree of each of the plurality of candidate paths based on the processing result and path information included in each candidate path.

Embodiment 26: According to the terminal in Embodiment 25, when executing the computer program, the processor further implements the following steps.

If path information of a second candidate path includes the processing result of the first processing manner, the first terminal determines a matching degree of the second candidate path as a first matching degree. The processing result of the first processing manner is a character string including the file information, and the second candidate path is any of the plurality of candidate paths.

If the path information of the second candidate path does not include the processing result of the first processing manner, the first terminal determines the matching degree of the second candidate path based on the processing result of the second processing manner and the path information included in the second candidate path. The processing result of the second processing manner includes a plurality of features of the target file, and each feature is in a one-to-one correspondence with each substring in the character string.

Embodiment 27: According to the terminal in Embodiment 26, when executing the computer program, the processor further implements the following steps.

If a quantity of features of the target file that are included in the path information of the second candidate path is greater than or equal to a first threshold, the first terminal determines the matching degree of the second candidate path as a second matching degree. The second matching degree is less than the first matching degree.

If the quantity of features of the target file that are included in the path information of the second candidate path is greater than or equal to the second threshold and less than the first threshold, the first terminal determines the matching degree of the second candidate path as a third matching degree. The third matching degree is less than the second matching degree.

If the quantity of features of the target file that are included in the path information of the second candidate path is less than the second threshold, the first terminal determines the matching degree of the second candidate path as a fourth matching degree. The fourth matching degree is less than the third matching degree.

Embodiment 28: According to the terminal in any of Embodiments 21 to 27, when executing the computer program, the processor further implements the following steps:

If there are a plurality of candidate paths corresponding to the highest matching degree, the first terminal determines a priority of each candidate path corresponding to the highest matching degree. The priority of the candidate path is obtained based on a priority of a manner of determining the candidate path.

The first terminal determines, as the storage location of the target file, a file storage location pointed to by a candidate path with a highest priority in the plurality of candidate paths corresponding to the highest matching degree.

Embodiment 29: According to the terminal in Embodiment 28, when executing the computer program, the processor further implements the following steps.

A priority of the file searching is higher than a priority of the object linking and embedding interface invoking, the priority of the object linking and embedding interface invoking is higher than a priority of the command line parsing, and the priority of the command line parsing is higher than a priority of the reading of information about recently used files.

Embodiment 30: According to the terminal in Embodiment 28, when executing the computer program, the processor further implements the following steps.

The first terminal obtains the target file from the storage location.

The first terminal sends the target file to a second terminal.

Embodiment 31: A chip is provided. The chip includes a memory and a processor, and the processor executes a computer program stored in the memory, to implement the file storage location determining method according to any one of Embodiments 1 to 10.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A file storage location determining method, comprising:
   determining, by a first terminal, a plurality of candidate paths corresponding to a target file, wherein each candidate path points to one file storage location;
   obtaining, by the first terminal, file information of the target file; and
   determining, by the first terminal based on the file information and the plurality of candidate paths, a file storage location pointed to by a first candidate path in the plurality of candidate paths as a storage location of the target file, wherein a matching degree of the first candidate path is the highest matching degree in matching degrees of the plurality of candidate paths; wherein the method further comprises:
   if there are a plurality of candidate paths corresponding to the highest matching degree, determining, by the first terminal, a priority of each candidate path corresponding to the highest matching degree, wherein the priority of the candidate path is obtained based on a priority of a manner of determining the candidate path; and
   determining, by the first terminal as the storage location of the target file, a file storage location pointed to by a candidate path with the highest priority in the plurality of candidate paths corresponding to the highest matching degree.

2. The method according to claim 1, wherein the determining, by the first terminal, the plurality of candidate paths corresponding to the target file comprises:
   determining, by the first terminal, the plurality of candidate paths corresponding to the target file in one or more of the following manners: object linking and embedding interface invoking, file searching, reading of information about recently used files, or command line parsing.

3. The method according to claim 1, wherein the obtaining, by the first terminal, the file information of the target file comprises:
   obtaining, by the first terminal, window information of the target file, wherein the window information is information displayed at a preset location of the target file; and
   determining, by the first terminal, the file information of the target file based on the window information.

4. The method according to claim 1, wherein the method further comprises:

determining, by the first terminal, a matching degree of each of the plurality of candidate paths based on the file information.

5. The method according to claim 4, wherein the determining, by the first terminal, the matching degree of each of the plurality of candidate paths based on the file information comprises:

processing, by the first terminal, the file information of the target file in at least one of a preset first processing manner or a preset second processing manner, to obtain a corresponding processing result, wherein precision of the first processing manner is higher than precision of the second processing manner; and determining, by the first terminal, the matching degree of each of the plurality of candidate paths based on the processing result and path information comprised in each candidate path.

6. The method according to claim 5, wherein the determining, by the first terminal, the matching degree of each of the plurality of candidate paths based on the processing result and path information comprised in each candidate path comprises:

if path information of a second candidate path comprises the processing result of the first processing manner, determining, by the first terminal, a matching degree of the second candidate path as a first matching degree, wherein the processing result of the first processing manner is a character string comprising the file information, and the second candidate path is any of the plurality of candidate paths; or if the path information of the second candidate path does not comprise the processing result of the first processing manner, determining, by the first terminal, the matching degree of the second candidate path based on the processing result of the second processing manner and the path information comprised in the second candidate path, wherein the processing result of the second processing manner comprises a plurality of features of the target file, and each feature is in a one-to-one correspondence with each substring in the character string.

7. The method according to claim 6, wherein the determining, by the first terminal, the matching degree of the second candidate path based on the processing result of the second processing manner and the path information comprised in the second candidate path comprises:

if a quantity of features of the target file that are comprised in the path information of the second candidate path is greater than or equal to a first threshold, determining, by the first terminal, the matching degree of the second candidate path as a second matching degree, wherein the second matching degree is less than the first matching degree;

if the quantity of features of the target file that are comprised in the path information of the second candidate path is greater than or equal to a second threshold and less than the first threshold, determining, by the first terminal, the matching degree of the second candidate path as a third matching degree, wherein the third matching degree is less than the second matching degree; or if the quantity of features of the target file that are comprised in the path information of the second candidate path is less than the second threshold, determining, by the first terminal, the matching degree of the second candidate path as a fourth matching degree, wherein the fourth matching degree is less than the third matching degree.

8. The method according to claim 1, wherein a priority relationship between a plurality of manners of determining the candidate path is as follows:

a priority of the file searching is higher than a priority of the object linking and embedding interface invoking, the priority of the object linking and embedding interface invoking is higher than a priority of the command line parsing, and the priority of the command line parsing is higher than a priority of the reading of information about recently used files.

9. The method according to claim 1, wherein the method further comprises:

obtaining, by the first terminal, the target file from the storage location; and sending, by the first terminal, the target file to a second terminal.

10. A terminal, comprising:

a processor, and a non-transitory memory coupled to the processor and configured to store a computer program comprising instructions that, when executed by the processor, cause the terminal to perform:

determining a plurality of candidate paths corresponding to a target file, wherein each candidate path points to one file storage location;

obtaining file information of the target file; and determining, based on the file information and the plurality of candidate paths, a file storage location pointed to by a first candidate path in the plurality of candidate paths as a storage location of the target file, wherein a matching degree of the first candidate path is the highest matching degree in matching degrees of the plurality of candidate paths, wherein the instructions further cause the terminal to perform:

if there are a plurality of candidate paths corresponding to the highest matching degree, determining a priority of each candidate path corresponding to the highest matching degree, wherein the priority of the candidate path is obtained based on a priority of a manner of determining the candidate path; and determining, as the storage location of the target file, a file storage location pointed to by a candidate path with the highest priority in the plurality of candidate paths corresponding to the highest matching degree.

11. The terminal according to claim 10, wherein the determining the plurality of candidate paths corresponding to the target file comprises:

determining the plurality of candidate paths corresponding to the target file in one or more of the following manners: object linking and embedding interface invoking, file searching, reading of information about recently used files, or command line parsing.

12. The terminal according to claim 10, wherein the obtaining the file information of the target file comprises:

obtaining window information of the target file, wherein the window information is information displayed at a preset location of the target file; and determining the file information of the target file based on the window information.

13. The terminal according to claim 10, wherein the computer program further comprises instructions that, when executed by the processor, cause the terminal to perform determining a matching degree of each of the plurality of candidate paths based on the file information.

14. The terminal according to claim 13, wherein the determining the matching degree of each of the plurality of candidate paths based on the file information comprises:

processing the file information of the target file in a preset first processing manner and/or a preset second processing manner, to obtain a corresponding processing result, wherein precision of the first processing manner is higher than precision of the second processing manner; and determining the matching degree of each of the plurality of candidate paths based on the processing result and path information comprised in each candidate path.

15. The terminal according to claim 14, wherein the determining the matching degree of each of the plurality of candidate paths based on the processing result and path information comprised in each candidate path comprises:

if path information of a second candidate path comprises the processing result of the first processing manner, determining a matching degree of the second candidate path as a first matching degree, wherein the processing result of the first processing manner is a character string comprising the file information, and the second candidate path is any of the plurality of candidate paths; or if the path information of the second candidate path does not comprise the processing result of the first processing manner, determining the matching degree of the second candidate path based on the processing result of the second processing manner and the path information comprised in the second candidate path, wherein the processing result of the second processing manner comprises a plurality of features of the target file, and each feature is in a one-to-one correspondence with each substring in the character string.

16. The terminal according to claim 15, wherein the determining the matching degree of the second candidate path based on the processing result of the second processing manner and the path information comprised in the second candidate path comprises:

if a quantity of features of the target file that are comprised in the path information of the second candidate path is greater than or equal to a first threshold, determining the matching degree of the second candidate path as a second matching degree, wherein the second matching degree is less than the first matching degree;

if the quantity of features of the target file that are comprised in the path information of the second candidate path is greater than or equal to a second threshold and less than the first threshold, determining the matching degree of the second candidate path as a third matching degree, wherein the third matching degree is less than the second matching degree; or if the quantity of features of the target file that are comprised in the path information of the second candidate path is less than the second threshold, determining the matching degree of the second candidate path as a fourth matching degree, wherein the fourth matching degree is less than the third matching degree.

17. The terminal according to claim 10, wherein a priority relationship between a plurality of manners of determining the candidate path is as follows:

a priority of the file searching is higher than a priority of the object linking and embedding interface invoking, the priority of the object linking and embedding interface invoking is higher than a priority of the command line parsing, and the priority of the command line parsing is higher than a priority of the reading of information about recently used files.

18. A non-transitory computer-readable storage medium, wherein the computer-readable storage medium stores computer instructions that, when executed by a processor of a terminal, cause the terminal to perform:

determining a plurality of candidate paths corresponding to a target file, wherein each candidate path points to one file storage location;

obtaining file information of the target file; and determining, based on the file information and the plurality of candidate paths, a file storage location pointed to by a first candidate path in the plurality of candidate paths as a storage location of the target file, wherein a matching degree of the first candidate path is the highest matching degree in matching degrees of the plurality of candidate paths, wherein the computer instructions further cause the terminal to perform:

if there are a plurality of candidate paths corresponding to the highest matching degree, determining a priority of each candidate path corresponding to the highest matching degree, wherein the priority of the candidate path is obtained based on a priority of a manner of determining the candidate path; and determining, as the storage location of the target file, a file storage location pointed to by a candidate path with the highest priority in the plurality of candidate paths corresponding to the highest matching degree.

* * * * *